US012758908B2

(12) United States Patent
Herding et al.

(10) Patent No.: US 12,758,908 B2
(45) Date of Patent: Oct. 13, 2026

(54) METHOD FOR THE DRY FILTRATION OF A GAS FLOW CARRYING FOREIGN OBJECTS, AND FILTER DEVICE FOR CLEANING RAW GAS CARRYING FOREIGN OBJECTS

(71) Applicant: HERDING GMBH FILTERTECHNIK, Amberg (DE)

(72) Inventors: Walter Herding, Hahnbach (DE); Urs Herding, Amberg (DE); Sebastian Dandorfer, Amberg (DE); Stefan Hajek, Amberg (DE); Dino Bethke, Königstein (DE); Klaus Rabenstein, Edelsfeld (DE); Maximilian Rösch, Etzenricht (DE); Thomas Sehr, Schnaittenbach (DE)

(73) Assignee: Herding GmbH Filtertechnik (DE)

( * ) Notice: Subject to any disclaimer, the term of this patent is extended or adjusted under 35 U.S.C. 154(b) by 881 days.

(21) Appl. No.: 17/796,106

(22) PCT Filed: Jan. 14, 2021

(86) PCT No.: PCT/EP2021/050704

§ 371 (c)(1),
(2) Date: Jul. 28, 2022

(87) PCT Pub. No.: WO2021/151681

PCT Pub. Date: Aug. 5, 2021

(65) Prior Publication Data

US 2023/0079987 A1 Mar. 16, 2023

(30) Foreign Application Priority Data

| | | |
|---|---|---|
| Jan. 28, 2020 | (DE) | 102020102036.8 |
| Feb. 14, 2020 | (DE) | 102020103982.4 |
| May 12, 2020 | (DE) | 102020112856.8 |

(51) Int. Cl.
*B01D 46/00* (2022.01)
*B01D 46/42* (2006.01)
(Continued)

(52) U.S. Cl.
CPC ..... *B01D 46/0093* (2013.01); *B01D 46/4263* (2013.01); *B01D 46/48* (2013.01);
(Continued)

(58) Field of Classification Search
CPC .... B01D 46/0093; B01D 46/71; B01D 46/84; B01D 2273/12; B01D 46/4263;
(Continued)

(56) References Cited

U.S. PATENT DOCUMENTS 4,080,431 A * 3/1978 Moss .................... C01B 21/064 423/440
5,527,019 A * 6/1996 Schwarz ............ B01D 46/0093 266/135

(Continued)

FOREIGN PATENT DOCUMENTS

DE 4130640 A1 3/2012
DE 102017207415 A1 11/2018

(Continued)

OTHER PUBLICATIONS

EP Search Report for counterpart EP Application No. 21702369.6 dated Sep. 22, 2025.

*Primary Examiner* — Robert Clemente
(74) *Attorney, Agent, or Firm* — Bachman & LaPointe, P.C.

(57) ABSTRACT

A method for the dry filtration of a gas flow carrying foreign objects, a filter device for cleaning off waste gas resulting from additive manufacturing technologies, comprises feeding a raw gas flow containing foreign objects into a raw gas space of a filter unit having at least one filter surface
(Continued)

separating a raw gas side from a clean gas side; feeding oxidant to a reaction region located on the raw gas side of the filter surface downstream of the filter surface; such that foreign objects contained in material cleaned off from the filter surface and/or in the raw gas flow react with the oxidant in the reaction region to form oxide-containing foreign objects.

19 Claims, 17 Drawing Sheets

(51) Int. Cl.

| | |
|---|---|
| ***B01D 46/48*** | (2006.01) |
| ***B01D 46/71*** | (2022.01) |
| ***B01D 46/84*** | (2022.01) |
| ***B22F 12/70*** | (2021.01) |
| ***B33Y 40/00*** | (2020.01) |

(52) U.S. Cl.
CPC ............. *B01D 46/71* (2022.01); *B01D 46/84* (2022.01); *B22F 12/70* (2021.01); *B33Y 40/00* (2014.12); *B01D 2251/10* (2013.01); *B01D 2258/02* (2013.01); *B01D 2273/12* (2013.01); *B01D 2273/20* (2013.01); *B22F 2999/00* (2013.01)

(58) Field of Classification Search
CPC ................ B01D 46/48; B01D 2251/10; B01D 2258/02; B33Y 40/00
See application file for complete search history.

(56) References Cited

U.S. PATENT DOCUMENTS

| | | | | |
|---|---|---|---|---|
| 7,972,399 B2 * | 7/2011 | Ahman | B01D 46/48 95/286 |
| 2013/0259758 A1 * | 10/2013 | Herding | B01D 46/38 55/303 |
| 2021/0276098 A1 † | 9/2021 | Hensen | |
| 2023/0142672 A1 † | 5/2023 | Kleinhans | |
| 2024/0269597 A1 * | 8/2024 | Dabruck | B01D 46/0093 |
| 2024/0335780 A1 * | 10/2024 | Kleinhans | B22F 10/73 |

FOREIGN PATENT DOCUMENTS

| | | | | |
|---|---|---|---|---|
| EP | 3248666 A2 * | 11/2017 | B01D 46/00 |
| KR | 100375566 B1 * | 3/2003 | |
| WO | 2012032003 A1 | 3/2012 | |
| WO | 2020017952 A1 | 1/2020 | |
| WO | 2021151938 A1 | 8/2021 | |

* cited by examiner
† cited by third party

METHOD FOR THE DRY FILTRATION OF A GAS FLOW CARRYING FOREIGN OBJECTS, AND FILTER DEVICE FOR CLEANING RAW GAS CARRYING FOREIGN OBJECTS

BACKGROUND

The invention relates to a method for the dry filtration of a gas flow carrying foreign objects, and to a filter device for cleaning raw gas carrying foreign objects.

WO 2012/032003 A1 shows a method for the dry filtration of gases carrying foreign bodies or objects, e.g. exhaust air from a paint shop, in which filter surfaces are coated with limestone powder ($CaCO_3$) as filtration aid before charging with raw gas containing foreign objects. In this way, clogging of pores of the filter by sticky foreign substances can be suppressed. This coating of filter surfaces with limestone powder before they come into contact with foreign objects is known as precoating. Precoating is typically used in the cleaning of exhaust air from wet paint shops.

SUMMARY

It is an object of the invention to prevent or suppress raw gas fires when filtering raw gases containing flammable foreign objects by means of a dry filter, in particular at high operating temperatures.

In the method for the dry filtration of a gas flow carrying foreign objects according to the invention, in particular in a filter device for cleaning off exhaust air produced in additive manufacturing technologies, a raw gas flow containing foreign objects is fed into a raw gas space of a filter unit which has at least one filter surface separating a raw gas side from a clean gas side. Furthermore, an oxidant is fed to a reaction region located on the raw gas side of the filter surface downstream of the filter surface. The oxidant is fed such that foreign objects contained in material cleaned off from the filter surface and/or in the raw gas flow react with the oxidant in the reaction region to form oxide-containing foreign objects.

The oxidant may be, for example, air or an oxygen-containing gas.

The basic idea of the present invention is to render foreign objects contained in the raw gas, which are readily combustible, harmless by specifically initiating and carrying out a controlled transfer of these combustible foreign objects into an oxidized configuration (i.e by chemical reaction). In the oxidized configuration, these foreign objects are generally poorly reactive or inert and no longer combustible, so that further handling of these oxidized foreign objects no longer requires special precautions. However, care has to be taken to ensure that the oxidation reaction proceeds in a controlled manner and, in particular, that the thermal energy generated during oxidation does not lead to the formation of flames or fires. This is achieved by suitable supply of oxidant to a predetermined reaction region and/or further measures for removing the thermal energy generated during the reaction from the reaction region.

For example, the reaction region may be downstream of the raw gas space with respect to the transport of foreign objects that have accumulated on the filter surface and have been cleaned off from the filter surface. Thus, the reaction region is located on the raw gas side, but downstream of the filter surface. If the oxidant is first supplied to the downstream reaction region, but not to the raw gas space or a region upstream of the raw gas space, the raw gas space remains free of oxidant, so that the actual filtration of the raw gas can proceed under largely inert conditions. Maintaining an inert environment in the raw gas space can be further ensured by closing off the reaction region from the raw gas space—at least when oxidant is supplied.

In addition, a heat transfer fluid may flow through the reaction region to remove heat generated during the reaction. The heat transfer fluid may be a fluid flow separate from the oxidant, for example an inert gas such as nitrogen, which is introduced into the reaction region and discharged from the reaction region after flowing through the reaction region. Such a heat transfer fluid can be maintained in a circulating flow if, after discharge of the heat transfer fluid from the reaction region, suitable heat exchangers are provided in which the heat transfer fluid can release its heat. It is also conceivable and indeed preferred that the heat transfer fluid also contains the oxidant. For example, air or a gas mixture of an inert gas with a predetermined content of oxygen can flow through the reaction region. The heat transfer fluid flows through the reaction region, i.e. a certain amount of heat transfer fluid is supplied to the reaction region per unit of time and heat transfer fluid is removed from the reaction region to the same extent.

Furthermore, an agglomerate collection region may be provided, which is designed to receive material cleaned off from the filter surface, which in the following will be referred to as cleaned-off material. Foreign objects accumulated on the filter surface or agglomerates containing foreign bodies, after cleaning off from the filter surface, are collected in the agglomerate collection region and stored therein. It may be provided that the agglomerate collection region has a first closure means which is controlled such that it closes off the raw gas space with respect to a discharge region downstream of the raw gas space for the removal of material cleaned off from the filter surface or establishes a connection between the raw gas space and the discharge region. The first closure means may, for example, comprise a first closure member provided in a boundary of the raw gas space relative to its surroundings. By controlling the first closure means, the amount of material passing from the raw gas space to the discharge region per unit of time can be controlled such that a predetermined amount of oxidizable material is always present in the reaction region and thus a predetermined amount of oxidizable material is transported through the reaction region per unit of time. As a result, suitable control of the first closure means can be used to ensure that the amount of heat generated in the reaction of the oxidizable material remains within a tolerable range such that the temperature in the reaction region does not exceed a predetermined threshold value.

In certain embodiments, the reaction region may be located within the discharge region such that the discharge region contains the reaction region. In particular, the reaction region may then be located downstream of the first closure means so that, when the first closure means is closed, the oxidation occurring in the reaction region does not affect the ambient conditions prevailing in the raw gas space.

In particular, it may be provided that the oxidant is fed to the discharge region. This allows the raw gas space to remain free, at least largely free, of oxidant because the oxidant is fed downstream of the raw gas space in the direction of flow of material cleaned off from the filter surface. In particular, it may be provided that the raw gas space remains closed with respect to the discharge region when oxidant is fed to the discharge region.

In further embodiments, the discharge region may comprise a second closure means arranged downstream of the first closure means in the direction of flow of material cleaned off from the filter surface. The reaction region may then be located between the first closure means and the second closure means. In this way, a fairly well-defined location of the reaction region can be obtained. In particular, it can be ensured by controlling the first and second closure means that the oxidation of combustible foreign objects taking place in the reaction region does not have a major impact on upstream regions (such as the raw gas space) or downstream regions (such as a collecting container for material cleaned off from the filter surface). In particular, the second closure means may comprise a second closure member configured to delimit the reaction region of the discharge arrangement with respect to a downstream agglomerate collecting container. In particular, the first closure means may be configured to have a lock function. If desired, the second closure means may additionally or alternatively be designed to have a lock function. To this end, the first closure means and/or the second closure means can have two closure members arranged one after the other or one closure member with lock function.

In a further embodiment, a conveying member may be provided in the reaction region for transporting material cleaned off from the filter surface. Mechanical conveying members, in particular a screw conveyor, a rotary valve or the like, can be used as conveying members. In particular, the conveying member can be designed such that a transport direction of material cleaned off from the filter surface can be reversed in order to better mix the cleaned-off material with oxidant and thus to safely inertize the cleaned-off material. It is also conceivable to implement a conveying member by gravity by providing a slope or gradient in the reaction region through which the cleaned-off material will fall. A further measure for promoting the transport of cleaned-off material can be that the cleaned-off material in the reaction region is acted upon by means of a fluidizing device. These measures can, of course, also be combined.

The discharge region may comprise an agglomerate collecting container. The agglomerate collecting container may be located immediately downstream of the raw gas space, optionally with the interposition of a first closure means. It is also conceivable that a transport section constituting the discharge region or part of the discharge region is interposed between the first closure means and the agglomerate collecting container in addition. Such a transport section may, for example, constitute or contain the reaction region as described above. For such embodiments in which the transport section comprises all or at least part of the reaction region, the paraphrase that the reaction region constitues a reaction section will be used hereinafter. A second closure means may then be provided between the transport section and the agglomerate collecting container, by means of which the further transport section can be closed off from the agglomerate collecting container.

In further embodiments, as an alternative or in addition to the embodiments described above, it may be provided that the agglomerate collecting container comprises the reaction region. The oxidation of combustible foreign objects then takes place either exclusively in the agglomerate collecting container or both in the agglomerate collecting container and in the further transport section.

To support the course of the oxidation reaction and/or to improve the removal of resulting reaction heat, at least one member for moving material cleaned off from the filter surface can be provided in the agglomerate collecting container. Such a member may operate mechanically, in particular in the manner of a screw conveyor or mixer. Such a member may also operate pneumatically, for example in the manner of a fluidizing device. It is also conceivable to provide an arrangement for pivoting, rocking or moving the agglomerate collecting container. Of course, these designs can also be combined with each other, for example by providing a fluidizing tray in the agglomerate collecting container, pivotable mounting of the agglomerate collecting container and/or additional provision of one or more mixer arms.

In addition, the reaction region can be temperature-controlled, both when designed as a reaction section and when arranged in the agglomerate collecting container. This can be effected, for example, by means of the heat transfer fluid already mentioned. In addition or alternatively, corresponding heating elements and/or cooling elements may be associated with a wall surrounding the reaction region for this purpose. On the one hand, it may be favorable if the reaction region can be heated in order to quickly reach or maintain a certain activation temperature for the oxidation. On the other hand, it will often be helpful if the reaction region can be cooled in order to be able to efficiently dissipate the thermal energy generated during the oxidation. In addition, it may be provided that the reaction region includes an ignition device to initiate the reaction of foreign objects with the oxidant.

In further embodiments, it may be provided that filtration aid is fed to the raw gas flow, the filter surface and/or the reaction region. The filtration aid is designed to suppress a reaction of foreign objects with oxidant, in particular with oxygen. For this reason, the filtration aid will also be referred to as extinguishing agent in the following. Besides, the filtration aid can also serve to bring the reaction region to a suitable temperature, in particular to supply or dissipate heat.

The filtration aid may be, for example, an inorganic material, in particular a silicon oxide-based inorganic material or a calcium carbonate-based inorganic material can be used as filtration aid.

The filtration aid can serve in particular to ensure that the oxidation taking place in the reaction region does not get out of control.

The addition of a filtration aid pursues a similar objective to that of the conventional precoating process, in which limestone powder ($CaCO_3$) is added. The precoating process is to be modified to the effect that a substance is added as filtration aid which is selected with regard to suppressing a reaction of spontaneously flammable or self-igniting foreign objects with oxidant, in particular with oxygen, during filtration. In this way, it can be achieved that fires do not occur or that, in any case after ignition, the further spread of flames is effectively hindered. The filtration aid is easy to dose. In particular, the filtration aid is suitable for forming agglomerates containing foreign objects. The addition of the filtration aid does not interfere with the operation of the filter during normal operation (i.e. without fire). In particular, this includes the fact that the filtration aid forms a filter cake on filter surfaces after contact with the gas flow containing foreign objects, which adheres well but is also just as easily removed by means of pressurized gas pulses.

The raw gas is an uncleaned gas, which thus carries foreign objects, and has not yet passed through a filter device. For example, the raw gas can be a smoke or gas (aerosol) carrying metal particles. The term smoke is intended to denote an aerosol of dust particles and/or liquid droplets in finely distributed form carried in an air flow or gas flow. In the case of smoke, the particle diameter is usually 800 nm or smaller. In the case of a raw gas carrying combustible foreign objects, it may be provided that the carrier gas is an inert gas, i.e. that the proportion of oxygen and other components that can act as oxidants is kept below a predetermined threshold in the carrier gas. In such a case, filtration of the raw gas also takes place under inert conditions, i.e. the proportion of oxygen and other components that can act as oxidants is also kept below a predetermined threshold in the raw gas space. Foreign objects do not come into contact with oxidants such as oxygen before material is discharged from the raw gas space.

An inorganic material is in particular a material that consists mainly of carbon-free compounds, in particular is free of organic chemical compounds of carbon. Certain carbon compounds such as carbon monoxide, carbon dioxide, carbon disulfide, carbonic acid, carbonates, carbides, ionic cyanides, cyanates and thiocyanates shall also be considered inorganic materials. Inorganic materials include, in particular, silicon dioxide.

In the context of the present invention, silicon dioxide (SiO2)-based or based on silicon dioxide means that the filtration aid comprises silicon dioxide or a silicon dioxide compound as its main constituent. The filtration aid may further comprise other materials present in lower mass proportions than silicon dioxide.

The raw gas space is a portion of the filter device into which the raw gas is introduced. Agglomerates containing foreign objects are formed by the accumulation of foreign objects on filtration aid. Such agglomerates can be formed in the raw gas flow or raw gas space, but in particular when foreign objects from the raw gas flow accumulate on or attach to filter surfaces as the raw gas flow passes through the filter surface of the filter unit into a clean gas space.

The addition of $SiO_2$-based filtration aid is particularly useful when the raw gas to be filtered contains foreign objects that are self-igniting or combustible. Such foreign objects or foreign particles tend to ignite spontaneously. This ignition can often occur without additional thermal energy input from the outside. When foreign objects have a small particle size, the foreign objects have a relatively large surface area relative to their volume, which makes the foreign objects particularly easy to ignite. It can be sufficient for the foreign objects to rub against each other as a result of movement in the raw gas flow. Frequently, the foreign objects are also electrostatically charged when they rub against each other, which leads to an additional ignition source due to electrical discharges. The addition of filtration aids on the basis of silicon dioxide, according to the invention, reliably suppresses such self-ignition in the raw gas.

The foreign objects may, for example, contain metals or be metals and have a granular, in particular chip-like, powder-like or smoke-like, configuration. In particular, the foreign objects may have a configuration that is not completely oxidized or even not oxidized at all. In particular, the foreign objects may be titanium powder or titanium chips. The foreign objects may be metallic foreign objects that are not oxidized or not completely oxidized. Such foreign objects are created, for example, during additive manufacturing of metallic workpieces, by using powdery metallic materials when building up workpieces layer by layer from a powder bed. Typical metals used in such processes, which can lead to combustible foreign objects in the exhaust air, are titanium, aluminum, magnesium and their alloys, as well as many steels such as structural steel, quenched and tempered steel, high-alloy stainless steels. The addition of a filtration aid based on $SiO_2$ proposed herein has proven to be particularly suitable for suppressing raw gas fires in additive manufacturing processes in which titanium and/or aluminum-magnesium alloys are used. Known, for example, is the laser sintering process as an additive manufacturing process that produces waste gases that tend to self-ignite.

When added, the filtration aid can have a granular, in particular powdery, configuration. This allows precise metering of the filtration aid into the raw gas flow and/or into the filter device, in particular for coating filter surfaces (precoating). In addition, an appropriate filtration aid allows a simple feed mechanism, such as a flap or a pressurized gas feed, to be used. The finer-grained the filtration aid is when added, the more efficient the formation of ignition-retardant agglomerates.

The filtration aid may be configured to bind metal-containing foreign objects with a granular configuration in agglomerates, in particular at temperatures of 600° C. or more, in particular at temperatures of 650° C. or more, in particular at temperatures of 700° C. or more, in particular at temperatures of 750° C. or more, in particular at temperatures of 800° C. or more. Depending on the filtration aid, temperatures of up to 1000° C., in particular up to 1250° C., in particular up to 1500° C., can be reached without inhibiting the formation of agglomerates too much and/or causing decomposition or disintegration of agglomerates to an undesirably large extent. The agglomerates formed are not flammable or only with difficulty flammable in the temperature ranges mentioned, so that higher operational safety is possible compared with conventional filter devices. Many $SiO_2$ glasses begin to soften at temperatures starting from 600° C. and can then form agglomerates with foreign objects. Depending on the configuration of the $SiO_2$ material, e.g. by adding additives or forming it as a glass foam, the temperature at which softening begins can be varied in suitable manner.

The agglomerates can change to a flowable configuration resembling a glass melt when heated strongly, and to a glass-like or vitreous configuration after cooling below the glass transition point. The filtration aids melt and thereby trap the foreign objects in the melt, so that inerting already occurs in this state. Once the melt has solidified, a vitreous configuration is formed. The formation of a flowable configuration can occur in particular after heating to temperatures of 600° C. or more, in particular 650° C. or more, in particular 1220° C. or more, in particular 750° C. or more, in particular 1320° C. or more. In this process, the agglomerates may have a vitreous configuration after cooling below the glass transition temperature. This can prevent oxidant from coming into contact with the metal-containing foreign objects.

In particular, the filtration aid can be a material that has a vitreous configuration or can be converted to a vitreous configuration under the influence of heat.

Materials based on silicon dioxide with a vitreous configuration are made from a solid and have an amorphous or at least partially crystalline structure. Such glasses have silicon dioxide as their main constituent and their network is formed mainly of silicon dioxide. These include, in particular, so-called silicate glasses.

The silicate base glass can be present in pure form, for example as silica glass. Quartz glass is also conceivable if higher softening temperatures are desired. In addition to the silicate base glass, additional components may be present, for example phosphate, borate, and the like.

The filtration aid may have as a main constituent at least one of the following materials: expanded glass beads, glass powder, silicon dioxide particles ($SiO_2$ particles), quartz powder, or a mixture of at least two of these materials. In particular, well-suited glass materials are those made from recycled waste glass (recycling glass), such as expanded glass or foamed glass. Expanded glass is produced by grinding waste glass cullet and adding binding and/or expanding agents thereto. This produces roughly round grains with small, gas-filled pores. Expanded glass can be produced in grain sizes from 0.04-16 mm. The granules have a closed pore structure. Foamed glass, in particular foamed glass ballast, is produced in a similar way. Expanded glass or foamed glass can be produced such that the lower limit for the temperature at which the softening range begins and/or the glass transition temperature assumes a value between 600° C. and 750° C.

In the event of fire, the still powdery or granular agglomerates of filtration aid and metal powder initially formed soften or melt under the action of heat. The flowable glass melt surrounds the metal-containing foreign objects and inerts the same. After solidification of the melt, a glass-like structure is formed, with metal-containing foreign objects permanently enclosed in the filtration aid or surrounded by the filtration aid. As soon as the flowable configuration is formed, the individual self-igniting particles of the metal are bound (vitrified) by the filtration aid. A reaction with oxidants, in particular with oxygen ($O_2$), is only possible with difficulty or is no longer possible at all in the vitrified state. A vitrification process of the type described occurs in particular at those locations where filtration aid agglomerates accumulate. In particular, a filter cake which has formed on the raw gas side on a filter surface and which also consists entirely or at any rate largely of filtration aid agglomerates, can exhibit such a phase transition from a powder-like or granular configuration to a flowable and finally glass-like configuration when heat is generated (for example in the case of a fire). Such a vitrification process can also take place at bulk cone surfaces formed in an agglomerate collection region during operation, leading to efficient inerting of the material contained in the agglomerate collection region. This vitrification process can be assisted by coating the surface of the cone of bulk material forming in the agglomerate collection region with a layer of filtration aid from time to time.

The agglomerates formed can remain chemically stable in the event of fire, i.e. in the presence of an oxidant (usually oxygen), at temperatures of up to 650° C., in particular at temperatures of up to 750° C., in particular at temperatures of up to 850° C., in particular at temperatures of up to 1000° C., in particular at temperatures of up to 1250° C., in particular at temperatures of up to 1500° C.

It is possible to selectively or specifically apply an oxidant to the agglomerate collection area, in particular the reaction section and/or the agglomerate collecting container, or to introduce oxidant into the agglomerate collection region, in particular the reaction section and/or the agglomerate collecting container. The introduction of oxidant can take place automatically, in particular in accordance with a control system or software. Alternatively or additionally, manual introduction of oxidant can also be provided. In particular, gases or gas mixtures with a sufficiently high proportion of oxygen can be used as oxidants. In the simplest case, the oxidant introduced can be air. The introduction of oxidant into the agglomerate collection region, in particular into the reaction section and/or into the agglomerate collecting container, has the effect that material stored in the agglomerate collection region, in particular in the reaction section and/or in the agglomerate collecting container, can react with the oxidant. This specifically initiates the reaction that actually needs to be suppressed or at any rate controlled. The heat of reaction generated during oxidation leads to an increase in temperature of the filtration aid. When the temperature reaches or even exceeds the vitrification temperature of the filtration aid, the filtration aid changes into a flowable vitreous phase, thereby enclosing the already oxidized and possibly still existing non-oxidized agglomerates. The thus effected phase change of filtration aid thus causes vitrification of the material in the agglomerate collection region, in particular in the reaction section and/or in the agglomerate collecting container, and thus renders this material insensitive to further oxidation processes and thereby harmless. After vitrification has taken place, the risk of uncontrolled ignition of material stored in the agglomerate collection region, in particular in the reaction section and/or in the agglomerate collecting container, can thus be avoided when the agglomerate collection region, in particular the agglomerate collecting container, is removed from the filter device. This measure allows the material stored in the agglomerate collection region to be transferred from a reactive configuration to an inert configuration in targeted and controllable manner. The amount of material stored in the agglomerate collection region, in particular in the reaction section and/or in the agglomerate collecting container, that is allowed to react with the oxidant, can be controlled by the amount of filtration aids and/or oxidant added in each case. This increases the safety of personnel when handling the agglomerate collection region, in particular when changing containers for receiving cleaned-off material.

The application, or charging, of oxygen to the agglomerate collection region, in particular the reaction section and/or the agglomerate collecting container, can take place in timed relationship with the application, or charging, of filtration aid to the agglomerate collection region, in particular the reaction section and/or the agglomerate collecting container. In particular, the application of filtration aid to the agglomerate collection region (24; 92) and/or the discharge region and/or the reaction region can precede the oxidant, or the agglomerate collection region, in particular the reaction section and/or the agglomerate collecting container, may have the oxidant applied thereto after filtration aid has been applied to the bulk cone or to the material stored in the agglomerate collection region, in particular in the agglomerate collecting container. In particular, the agglomerate collection region, in particular the reaction section and/or the agglomerate collecting container, may have the oxidant applied thereto before an agglomerate collecting container associated with the agglomerate collection region is detached from its holder and removed. Then, when the material in the agglomerate collection region comes into contact with atmospheric oxygen after the agglomerate collecting container has been removed, the combustible materials or mixtures are rendered harmless by vitrification or transfer to an inert oxidized configuration so that the risk of uncontrolled oxidation or fire no longer exists.

After exposure to heat, the agglomerates formed from filtration aid and foreign objects exhibit a shell enclosing foreign objects and having a glass-like configuration, so that no contact of foreign object(s) with oxidant occurs. This reliably prevents a fire in the raw gas space, in a raw gas supply line upstream of the raw gas space of the filter device and/or in a region downstream of the filter device, in particular in an agglomerate collection region or a line leading to an agglomerate collection region.

In this case, a chemically resistant substance can form from the filtration aid, which can hermetically enclose or trap the self-igniting foreign objects before they can ignite. The chemically resistant substance formed from the filtration aid can even become flowable under heat, thus smothering flames after foreign objects have ignited. In particular, silicon dioxide glasses remain chemically stable as a melt up to high temperatures and do not decompose when exposed to oxygen or other oxidants. In particular, silicon dioxide glasses do not split off oxygen-containing functional groups even at high temperatures.

The filtration aid may be designed such that it does not split off members or compounds that may act as oxidants when it is heated to temperatures of 600° C. or more, in particular to temperatures of 650° C. or more, in particular to temperatures of 700° C. or more, in particular to temperatures of 750° C. or more, in particular to temperatures of 800° C. or more. In particular, the filtration aid can be designed to remain chemically stable up to temperatures of 1000° C., in particular up to temperatures of 1250° C., in particular up to temperatures of 1500° C., in particular not to split off any elements or compounds that can act as oxidants.

The filtration aid may have an average particle size of 10 to 30 μm, preferably between 15 and 25 μm. An average particle size is understood to the effect that a major part of the particles of the filtration aid have a diameter that is between 10 and 30 μm. All data refer to the X50 value, i.e. that 50% of the particles have diameters in the range mentioned in each case.

Depending on the raw gas to be filtered, the filtration aid may have a softening point or glass transition temperature of 600° C. or more, in particular of 650° C. or more, in particular of 700° C. or more, in particular of 750° C. or more, in particular of 800° C. or more, and up to 1000° C., in particular up to 1250° C., in particular up to 1500° C. In the event of fire, this permits a phase change of the filtration aid, i.e. a transition of the filtration aid to a flowable state, and thus vitrification of the foreign objects. Thus, a fire can be reliably avoided or stopped.

The method may further comprise distributing or atomizing the filtration aid in the raw gas space and/or in the reaction region, in particular uniform distribution on components arranged in the raw gas space and/or in the reaction region, such as filter elements and raw gas space walls or walls in the discharge region of the filter device; in particular in the region of the reaction section and/or in the agglomerate collecting container.

In the method, agglomerates that contain foreign objects and have accumulated on the filter surface can be cleaned off and collected and stored in an agglomerate collection region. It can be provided that the agglomerate collection region is charged with filtration aid.

The charging of the agglomerate collection region can take place when the agglomerate collection region stores a predetermined amount of agglomerates. This prevents the amount of agglomerates adjacent each other from exceeding a predetermined amount, thereby reducing the risk of ignition of the agglomerates.

Prior to removing an agglomerate collecting container associated with the agglomerate collection region, the agglomerate collection region may be charged with filtration aid such that the foreign body-containing agglomerates collected in the agglomerate collection region or agglomerate collecting container are covered with a layer of filtration aid. After the agglomerate collection region has been charged with filtration aid, the agglomerate collection region may additionally be charaged with an oxidant, in particular after filtration aid has been applied to material stored in the agglomerate collection region and before the agglomerate collecting container is removed.

The agglomerate collecting container can be a disposable container intended for single use only. After the agglomerate collection region has been charged with filtration aid and oxidant, the agglomerate collecting container can be removed and disposed of. Since, after addition of oxidant, vitrification of the cleaned-off material in the agglomerate collection region has already taken place before the agglomerate collecting container is removed from its holder, it is ensured that all material is bound in the agglomerate collecting container and that it can be safely disposed of in the usual manner.

The method and the device according to the invention, respectively, may be used in cleaning off foreign objects from a gas flow in a filter device, in particular in a device of one of the following types:

- a device for the removal of waste gases generated during additive manufacturing of workpieces made of powdery metallic starting materials;
- a device for eliminating fumes or flue gases produced during the manufacture of workpieces by laser sintering processes;
- a device for eliminating air contaminants in a laser beam welding system or other welding fume extraction system,
- a device for eliminating contaminants in fumes, in particular in fumes produced in additive manufacturing processes or in thermal processes.

A filter device for cleaning raw gas carrying foreign objects, according to the invention, comprises at least one filter element having at least one filter surface in a raw gas space, to which a raw gas flow containing foreign objects can be fed. Further, an oxidant supply means is provided which is adapted to feed an oxidant to a reaction region located on the raw gas side of the filter surface downstream of the filter surface. The oxidant supply means is designed such that foreign objects contained in material cleaned off from the filter surface and/or in the raw gas flow react with the oxidant in the reaction region to form oxide-containing foreign objects.

The explanations given above with reference to the method according to the invention also apply analogously to the filter device according to the invention.

In particular, the oxidant may be air or an oxygen-containing gas. In particular, the reaction region may be located downstream of the raw gas space. In particular, the reaction region may be adapted to be shut off or closed off with respect to the raw gas space when the oxidant is supplied. These measures help to ensure that the raw gas space remains largely free of oxidant.

Moreover, the filter device may have an arrangement for supplying a heat transfer fluid to the reaction region and discharging the heat transfer fluid after flowing through the reaction region. Such an arrangement assists in dissipating thermal energy generated by the reaction in the reaction region. In this regard, the heat transfer fluid may also contain the oxidant, for example, in the form of air or in the form of a gas mixture of an inert gas having a predetermined content of oxygen. The heat transfer fluid flows through the reaction region, i.e. it is supplied to the reaction region and discharged from the reaction region.

Furthermore, the filter device may comprise an agglomerate collection region adapted to receive material cleaned off from the filter surface. The filter device comprises a cleaning-off arrangement, for example a pressurized-gas cleaning-off arrangement, by means of which foreign objects or agglomerates containing foreign objects, which have accumulated on the filter surface, are cleaned off from time to time. This cleaned-off material is collected and stored in the agglomerate collection region.

The agglomerate collection region can have, in particular, a first closure means which can be controlled such that it closes off the raw gas space with respect to a discharge region downstream of the raw gas space for the removal of material cleaned off from the filter surface, or establishes a connection between the raw gas space and the discharge region. The first closure means may comprise, for example, a first closure member provided in a boundary of the raw gas space relative to its surroundings.

By controlling the first closure means, the amount of material passing from the raw gas space to the discharge region per unit of time can be controlled such that a predetermined amount of oxidizable material is always present in the reaction region. As a result, the amount of heat generated during the reaction of the oxidizable material can be maintained within a tolerable range.

In certain embodiments, the discharge region may contain the reaction region. In that case, the reaction region will as a rule be located downstream of the first closure means.

The oxidant supply means may be configured to open into the discharge region.

In this way, it can be ensured that the raw gas space remains largely free of oxidant, because the oxidant is supplied downstream of the raw gas space in the direction of flow of material cleaned off from the filter surface. In particular, in support hereof, it may be provided that the raw gas space remains closed to the discharge region when oxidant is supplied to the discharge region.

In further embodiments, the discharge region may include a second closure means disposed downstream of the first closure means in the direction of flow of material cleaned off from the filter surface. The reaction region may then be located between the first closure means and the second closure means.

In particular, the second closure means may comprise a second closure member configured to delimit the reaction region of the discharge arrangement with respect to a downstream agglomerate collecting container.

In further embodiments, a conveying member may be provided in the reaction region for transporting material cleaned off from the filter surface. Such a conveying member may be a mechanically operating conveying member, in particular a screw conveyor or a rotary valve. Alternatively or additionally, a slope or gradient may be provided in the reaction region through which the material cleaned off from the filter surface will fall. Furthermore, it is conceivable to provide a fluidizing device in the reaction region as a conveying member. All these measures mentioned can be combined with each other. The conveying member can be designed such that a transport direction of material cleaned off from the filter surface can be reversed.

In further embodiments, the discharge region may comprise an agglomerate collecting container. In particular, it may be provided that the agglomerate collecting container comprises the reaction region.

For example, at least one member for moving material cleaned off from the filter surface may be provided in the agglomerate collecting container. Such a member may be, for example, a mechanically operating member, in particular a screw conveyor or a mixer. It is also conceivable that such a member is designed as a fluidizing device or that such a member comprises a fluidizing device.

Furthermore, it is conceivable to support the agglomerate collecting container movably, for example pivotably, rotatably or rockably. The aforementioned embodiments may also be combined.

In addition, in certain embodiments, temperature control devices can be provided by means of which the reaction region can be temperature-controlled, in particular heated and/or cooled. Furthermore, it may be provided that the reaction region comprises an ignition device for starting the reaction of foreign objects with the oxidant.

In further embodiments, a filtration aid feed arrangement may be provided with a filtration aid feed line for feeding filtration aid, which opens into the raw gas space and/or into the raw gas flow upstream and/or downstream of the raw gas space. The filtration aid is designed to suppress a reaction of foreign objects with oxidant, in particular with oxygen. The filtration aid may be, for example, an inorganic material, in particular an inorganic material based on silicon dioxide or calcium carbonate.

The filtration aid may be supplied to the raw gas flow upstream of the raw gas space, to the raw gas space, the filter surface, the discharge region, in particular to the reaction region and/or a collection region for material cleaned off from the filter surface (hereinafter also referred to as agglomerate collection region).

The filtration aid feed arrangement can be designed such that the filtration aid forms a glass-like protective layer under the effect of heat, on filter surfaces facing the raw gas space or the reaction region and/or on raw gas space walls or reaction region walls and/or can be distributed in the raw gas flow in such a way that glass-like agglomerates of filtration aid and foreign objects are formed in the raw gas flow upstream and/or downstream of the filter surface, in particular in the discharge region, or on the filter surface under the effect of heat.

The filter device may further comprise an agglomerate collecting container associated with the agglomerate collection region and disposed on a bottom side of the filter device, the agglomerate collecting container having a filtration aid entry opening through which the filtration aid may be fed into the agglomerate collecting container. The agglomerate collecting container may thereby form the agglomerate collection region.

The filter device can have a first line, through which oxidant can be delivered from an oxidant reservoir and/or filtration aid from a filtration aid reservoir into the raw gas space and/or into a raw gas line opening into the raw gas space and/or into a reaction region or into a reaction section, and in particular a second line, through which oxidant can be delivered from the oxidant reservoir and/or filtration aid from the filtration aid reservoir into the agglomerate collecting container. The oxidant may be air or an oxygen-containing gas mixture, wherein the oxidant, when introduced into the agglomerate collecting container, subjects material located in the agglomerate collecting container to oxidant. If desired, the introduction of oxidant may also be take place via a third line that is different from the second line.

The reaction region, or reaction section, can be defined as the part of a filter device that connects the raw gas space with the agglomerate collecting container. This reaction region is designed to allow reaction of the material cleaned off from a filter surface with oxidant in order to allow a controlled and thus safe reaction to take place there. For this purpose, the reaction region can be formed with an oxidant inlet through which oxidant can be introduced into the reaction region. The filtration aid or the extinguishing agent can also be introduced into the reaction region via the same inlet or via a separate inlet. The reaction region may be designed to be closable, for example by one or more shut-off valves or a shut-off device such as a rotary valve, so that the amount of cleaned-off material can be appropriately controlled such that the reaction in the reaction region does not exceed a predetermined strength. Furthermore, the reaction region may have a waste gas outlet through which excess oxidant including oxidation residues, such as soot and other foreign matter particles, may be discharged from the reaction region. The reaction region may also include a transport member, such as a screw conveyor, a fluidizing tray, or a conveyor belt. The screw conveyor rotates to convey the cleaned-off material through the reaction region. The fluidizing tray is, for example, a sheet or grid through which a gaseous conveying medium can be passed so that the cleaned-off material located on or above the fluidizing tray is transported to a reaction region outlet. The conveyor belt has the same function, but enables this function in a different manner.

The filter device may include a material diverter connecting the second line to the first line. This allows selective introduction of the filtration aid into both the raw gas space and the agglomerate collecting container. This increases safety for operators when operating filter devices according to the invention.

The material diverter can be controllable such that a filtration aid flow can be selectively passed through the first line and/or through the second line. Preferably, an automatic control device can be used for this purpose. Alternatively, the material diverter can also be actuated by operating personnel that manually manipulates the material diverter and thus introduces the filtration aid flow into the first line and/or the second line.

The agglomerate collecting container may include an oxidant entry opening through which oxidant, in particular air or an oxygen-containing gas mixture, may be introduced into the agglomerate collecting container. By adding oxidant, oxidizable material stored in the agglomerate collecting container can be selectively activated to render the oxidizable material harmless by vitrification with filtration aid and/or conversion of the oxidizable material into poorly reactive or inert oxidized material. This enhances the safety of service personnel when replacing the agglomerate collecting container.

The filter device may comprise furthermore an oxidant line that opens into the oxidant entry opening of the agglomerate collecting container. Oxidant may be selectively delivered to the agglomerate collecting container automatically or manually through the oxidant line. Automatic is understood to mean that a control unit takes over the feeding of oxidant. In the case of manual feeding, this is done by service personnel operating a switch or lever to introduce the oxidant into the agglomerate collecting container. In certain embodiments, the second line may serve as an oxidant line at the same time. For example, the introduction of filtration aid into the agglomerate collecting container may take place simultaneously with the application of oxidant to the material in the agglomerate collection region. It is also possible to carry out the introduction of filtration aid into the agglomerate collecting container and the application of oxidant to the material located in the agglomerate collecting container in terms of time one after the other, for example by means of additional valves in the second line. For example, oxidant could be introduced into the agglomerate collecting container first, followed by the filtration aid.

The filter device may comprise furthermore a metering device configured to adjust a predetermined amount of filtration aids. This allows precise delivery of filtration aids into the filter device, thereby increasing the operational safety of the filter device.

The aforementioned embodiments and advantages of the method according to the invention also apply to the use according to the invention and the filter device according to the invention.

BRIEF DESCRIPTION OF THE DRAWINGS

The invention and specific embodiments of the invention will be explained in more detail below by way of exemplary embodiments.

DETAILED DESCRIPTION

Figure 1:
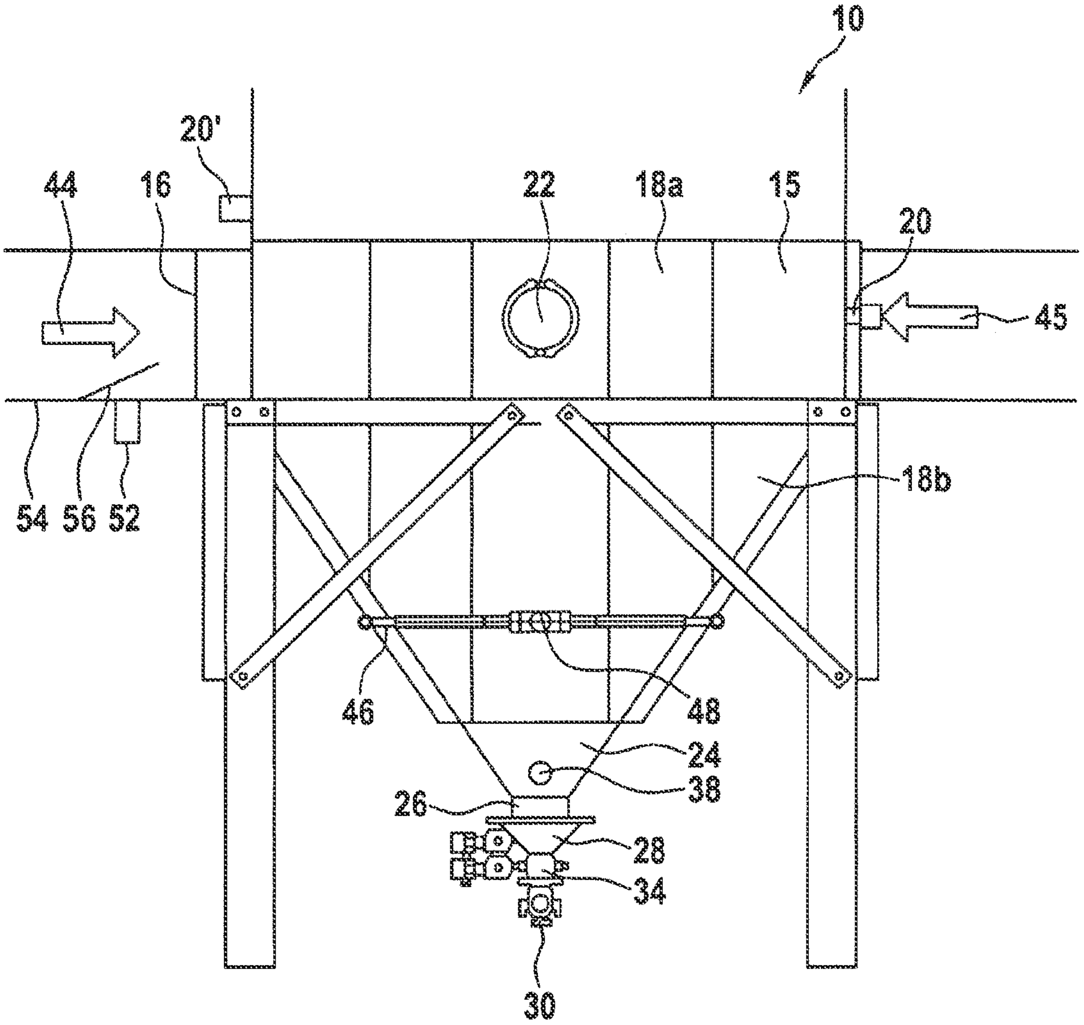
FIG. 1 shows a side view of a filter device according to the invention.
Figure 2:
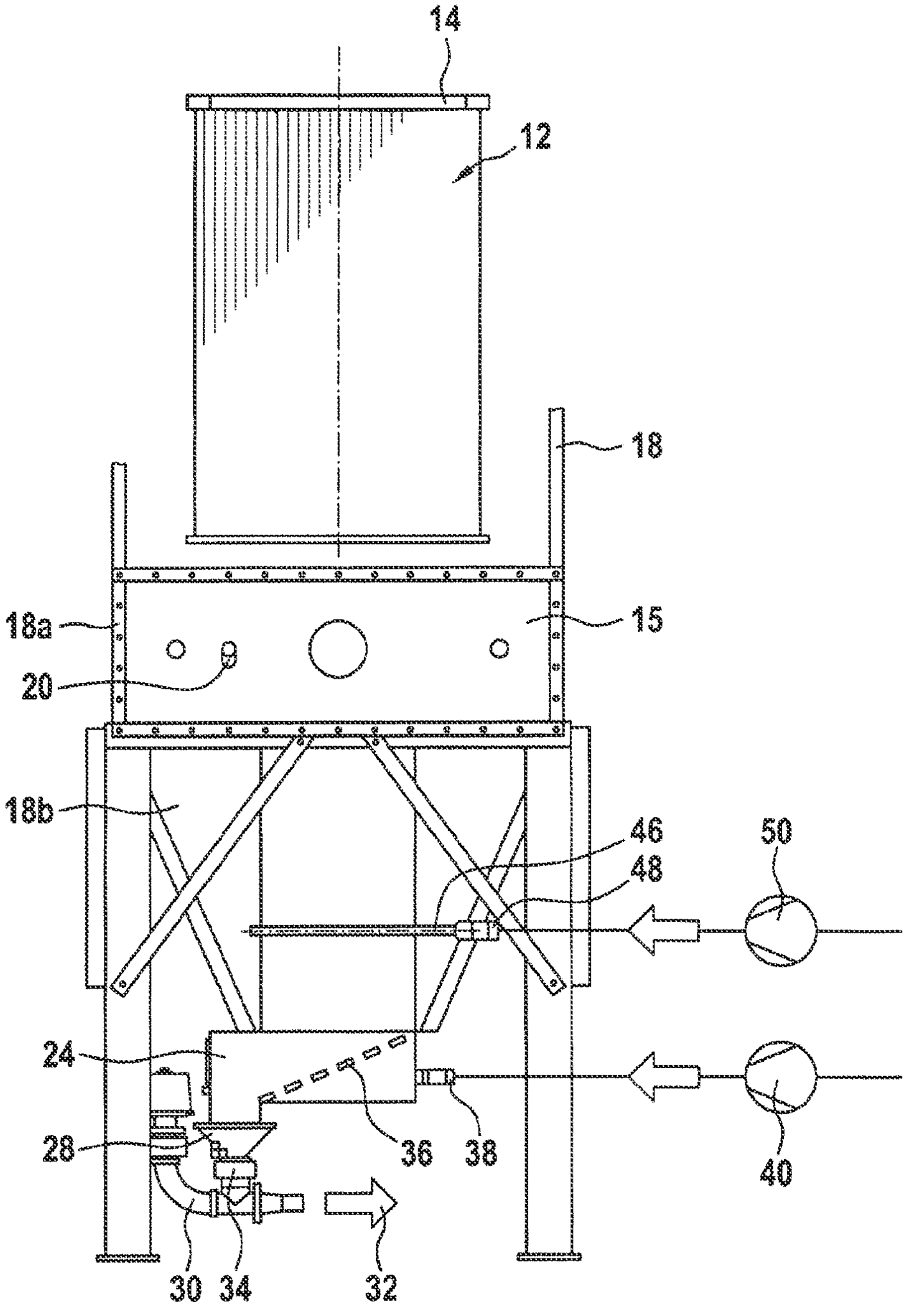
FIG. 2 shows the filter device of FIG. 1 in a side view rotated by 90 degrees with respect to the view of FIG. 1.

FIGS. 1 and 2 show, in side views rotated 90 degrees relative to one another, a filter device 10 for cleaning raw gas carrying foreign objects, according to an embodiment. The filter device 10 comprises a filter unit 12 (not shown in FIG. 1, in FIG. 2 one of the filter elements 14 of the filter unit 12 is indicated). The filter unit 12 is mounted above a raw gas inflow opening 16 in an upper part of a housing 18, which has been partially omitted for the sake of clarity. The filter unit 12 comprises a plurality of filter elements 14 configured as rigid-body filters or dry filters, which are attached to a common holder and extend parallel to each other in a vertical direction, as schematically indicated in FIG. 2 which shows one of the filter elements 14 at its installation position. Each of the filter elements 14 has at least one filter surface which is acted upon by the raw gas. In FIG. 1, the filter surface acted upon by the raw gas is located on the outside of one of the respective filter elements 14.

In the lower part of the housing 18 shown in FIGS. 1 and 2, which encloses a raw gas space 15, a filtration aid feed opening 20 and a raw gas space opening 22 are formed in addition to the raw gas feed opening 16. These openings 16, 20, 22 are located substantially at the same level in an upper region 18*a* of the lower housing part 18. Alternatively or additionally, the filtration aid feed opening 20 may be arranged downstream of or adjacent the raw gas inflow opening 16 in the direction of flow of the raw gas in the raw gas space 15, so that the raw gas mixes with the filtration aid before the raw gas reaches the filter elements 14. Due to a flame suppressing effect of the filtration aid, the latter may also be referred to as extinguishing agent. In FIG. 1, such a filtration aid feed opening 20' is shown above the raw gas inflow opening 16, i.e. in the direction of the filter unit 12. In a region 18*b* adjoining below this region 18*a*, the housing 18 takes the form of a funnel with downwardly tapering sidewalls. Downwardly adjoining the housing 18 is a collection region 24 in which material containing foreign bodies, which has been retained by the filter elements, is collected before it is passed through a disposal opening 26 arranged at the lowest point of the collection region 24 and a disposal funnel 28 into a vacuum conveying device 30 and disposed of, see the arrow 32 in FIG. 1.

Since the raw gas carries combustible foreign objects, it may be provided that an inert gas is used as carrier gas for the raw gas, i.e. that the proportion of oxygen and other substances that can act as oxidants is kept below a predetermined threshold in the carrier gas. Therefore, the proportion of oxygen and other substances that can act as oxidants is also kept below a predetermined threshold in the raw gas space 15. Thus, filtration of the raw gas carrying combustible foreign objects takes place under inert conditions, i.e. foreign objects do not come into contact with oxidants such as oxygen until material is discharged from the raw gas space 15.

The disposal funnel 28 can be closed at its lowest point by a valve 34, which is opened only briefly when material containing foreign bodies is to be discharged from the collection region 24. In order to ensure disposal of the foreign objects collected in the collection region 24, which are generally readily self-igniting in the absence of filtration aids, an inclined fluidizing tray 36 is located in the collection region 24, to which gas is supplied via a port 38. Connected to the port 38 is a blower, only schematically designated 40, through which pressurized gas or inert gas is conducted into the fluidizing tray 36. The gas flow generated in the blower 40 is adjusted such that, on the one hand, the material collected in the collection region 24 is loosened to such an extent that it is readily free-flowing and can thus be easily removed via the disposal opening 26, but that, on the other hand, this material cannot get back out of the collection region 24 into the housing 18 or into the raw gas space 15.

The raw gas flow schematically indicated by the arrow 44, which carries foreign objects that are to be separated by the device 10, enters the raw gas space 15 enclosed by the housing 18 via a raw gas feed line 54 through the raw gas inflow opening 16, said raw gas space 15 being bounded on its upper side by the raw gas side of the filter unit 12. After entering the raw gas space 15, the raw gas flow 44 is transported to the filter unit 12. On the opposite side of the housing 18 from the raw gas inlet opening 16 is the filtration aid feed opening 20 through which filtration aids can be fed from a reservoir or storage container 72 into the raw gas space 15. The filtration aids can be introduced into the raw gas space 15 before the latter is charged with the raw gas flow 44. The filtration aids introduced then accumulate, in particular, on filter surfaces of the filter elements 14 and/or on walls of the raw gas space 15, where they each form a layer of filtration aid (precoat layer). The flow of filtration aids entering the raw gas space 15 through the filtration aid feed opening 20 is indicated by an arrow 45 in FIG. 1.

Alternatively or additionally, a filtration aid feed opening 52 may be arranged in the raw gas feed line 54. The raw gas feed line 54 is connected to the raw gas inflow opening 16. This allows the filtration aid to be introduced into the raw gas flow 44 before it enters the raw gas space 15 of the filter device 10. This results in advantageous mixing of foreign objects contained in the raw gas flow 44 and the filtration aid so as to raise the self-ignition threshold of the raw gas. Optionally, a baffle plate or distributor plate 56 may be disposed near the filtration aid feed opening 52 such that the filtration aid is uniformly distributed in the raw gas flow 44. For this purpose, the filtration aid flow is directed onto the distributor plate 56, whereby particles of the filtration aid bounce off the distributor plate 56 "chaotically", i.e. in non-predetermined paths, and are distributed in the raw gas flow 44. A corresponding distributor plate may also be arranged in the raw gas space 15 at the filtration aid feed opening 20 or 20', which enables a uniform distribution of the filtration aid, in particular on a filter surface of the filter elements 14. In this case, the distribution plate can be arranged at the filtration aid feed opening 20 such that particles of the filtration aid bouncing off from the same are passed in the direction of the filter elements 14 and adhere to the filter surface of the filter elements 14.

In a lower portion of the funnel-shaped housing region 18*b*, there is a port 48 communicating with a ring line 46 extending horizontally through the housing 18*b*. The ring line 46 is located above the collection region 24 and, in particular, always above the material collected in the collection region 24. Connected to the port 48 is a further blower 50, which is also indicated only schematically in FIG. 2. The blower 50 may comprise, for example, a side-channel compressor, as does the blower 40. In a preferred embodiment, the blower 50 is operated continuously during operation of the filter device 10. The port 48 and the ring line 46 are optional features for the filter device 10. In the event that an inert gas is provided as carrier gas for the raw gas, an inert gas should also enter the raw gas space 15 via the ring line 46.

Associated with the filter unit 12 is a pressurized-gas cleaning-off unit (not shown in the figures) that is located on the clean gas side of the filter unit 12 above the filter elements 14. At certain intervals in time, the pressurized-gas cleaning-off unit acts upon a respective filter element 14 such that the filter element 14 experiences a pressure surge from its clean gas side. The pressure surge causes foreign objects, such as filtration aids and readily self-igniting foreign objects, which have accumulated on the filter surface on the raw gas side of the respective filter element 14, to detach from the filter element 14 and fall down as a result of their gravity.

In particular, the filtration aid may be a material having a glass-like or vitreous configuration or capable of being converted to a vitreous configuration under the action of heat. Silicon dioxide-based materials with a glass-like configuration are made from a solid and have an amorphous or at least partially crystalline structure. Such glasses have silicon dioxide as their main constituent and their network is formed mainly of silicon dioxide. These include, in particular, so-called silicate glasses. The silicate base glass can be present in pure form, for example as quartz glass or silica glass. In addition to the silicate base glass, additional components may be present, for example phosphate, borate, and the like.

Figure 3:
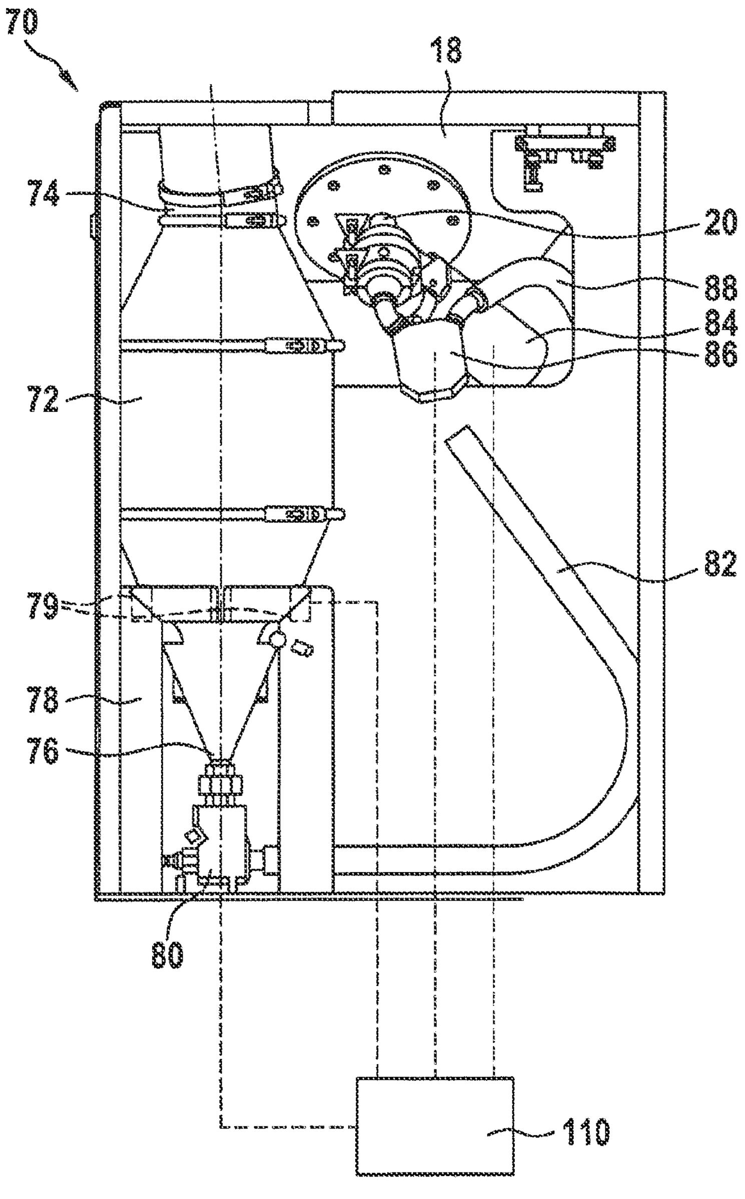
FIG. 3 shows a detailed representation of a metering unit for the filter device of FIGS. 1 and 2.

FIG. 3 shows a metering unit 70 for feeding the filtration aid into the filter device 10 or the raw gas flow 44. The metering unit 70 has a storage container 72 which can be filled with the filtration aid via a filling opening 74. The storage container 72 has an outlet 76 at its lower end, from which the filtration aid is withdrawn when required. The outlet 76 is preferably arranged such that the filtration aid is conveyed to the outlet 76 as far as possible by gravity alone. The storage container 72 is secured in a holder 78. The holder 78 may be provided with one or more weight sensors 79, by means of which a filling level of the storage container 72 can be determined. From this filling level, a control unit 110 can quickly and accurately determine how much filtration aid has been fed to the raw gas space 15.

A solids injector 80 is disposed at the outlet 76 and is controllable to transport the filtration aid from the solids injector 80 to a valve 84 via a connecting line 82 and then to one or more of the filtration aid feed openings 20, 20' and 52. The solids injector 80 may be pneumatically operated so that the filtration aid is transported through the connecting line 82 by means of pressurized gas. In FIG. 3, the connecting line 82 optionally includes a material diverter 86 that permits a filtration aid flow to be introduced into a feed line 88. This feed line 88 is connected to a feed opening 90 in a docking plate 98, allowing the filtration aid to be transported into an agglomerate collecting container 92 associated with the agglomerate collection region 24. Another valve 94 is disposed in the feed line 88 close to the feed opening 90 to control a filtration aid feed into the agglomerate collection region 92.

Preferably, the valves 84, 94 may be flap valves or disc valves.

Alternatively, the agglomerate collecting container 92 may itself have a feed opening, not shown, which is connected to the feed line 88 and the valve 94. Alternatively, the feed line 88 may be connected directly to the storage container 72 through a further solids injector not shown. In that case, the filtration aid could be introduced at different pressures and simultaneously into both the raw gas flow 44 and the agglomerate collection region 92. This allows for more efficient control of the filter device and further enhances safety during operation of the filter device 10.

Figure 4:
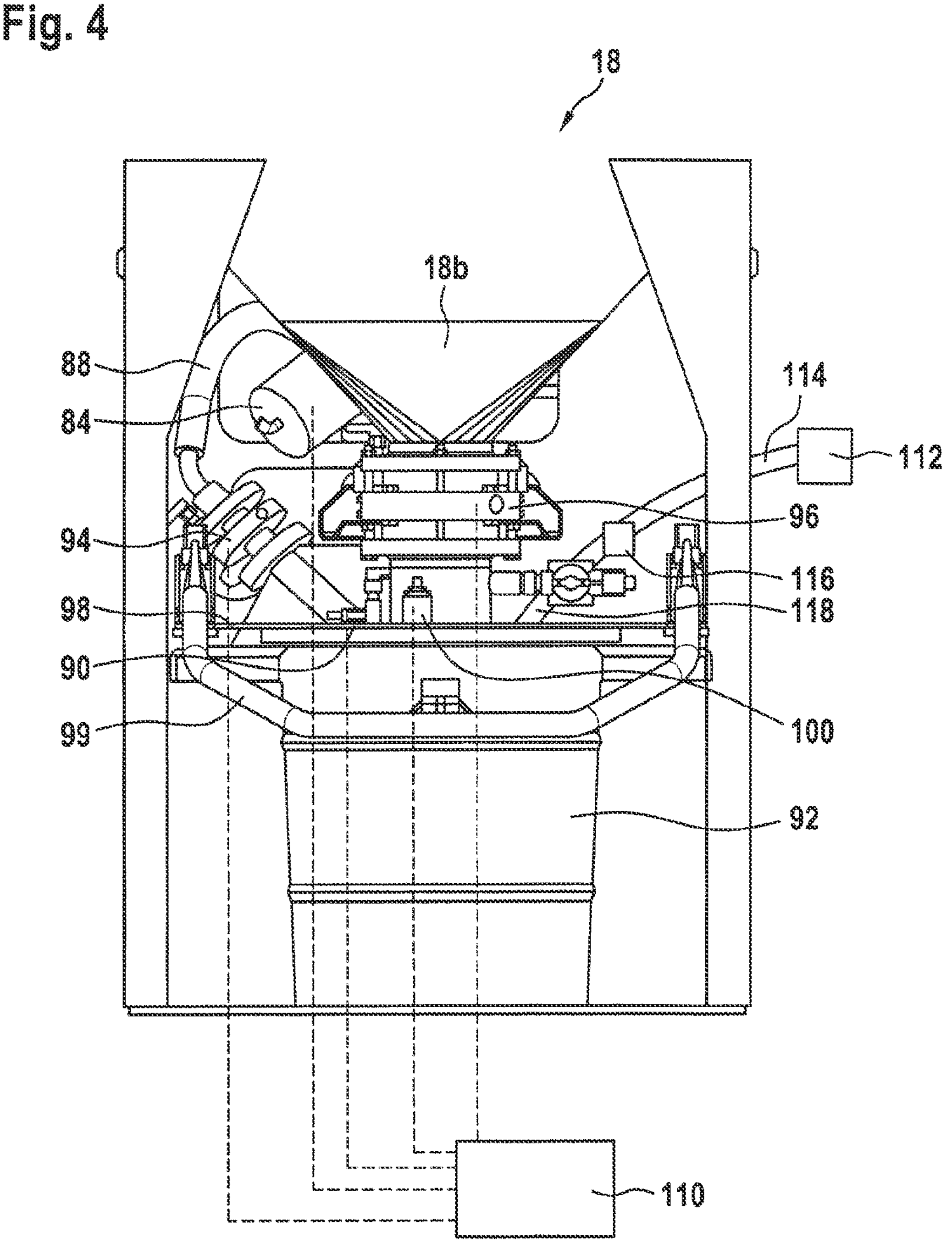
FIG. 4 shows a detailed representation of one end of the filter device of FIG. 1.

FIG. 4 shows another embodiment of the filter device 10 in which, instead of the disposal funnel 28 and the vacuum conveying device 30 connected thereto, the agglomerate collecting container 92 is arranged in the lower housing region **18*b*. Between the lower housing region 18*b* and the agglomerate collecting container 92, a discharge flap 96 and the docking plate 98 are arranged through which foreign objects are discharged from the raw gas space 15 into the agglomerate collecting container 92. The docking plate 98 permits a gas-tight connection of the agglomerate collecting container 92 to the discharge flap 96. The agglomerate collecting container 92 has a filling level sensor 100, which is used to check the filling level of the agglomerate collecting container 92. For example, the filling level sensor 100 may trigger a signal indicating that the agglomerate collecting container 92 needs to be emptied, or data from the filling level sensor 100 may be used to control the solids injector 80, the material diverter 86, and the valve 94 via the control unit 110 such that the filtration aid is introduced into the agglomerate collecting container 92 to build up a barrier layer of filtration aid on the particles present in the agglomerate collecting container 92. This reduces or completely suppresses a tendency for self-ignition of the particles in the agglomerate collecting container 92. It is also possible to periodically introduce filtration aid into the agglomerate collecting container 92** several times so that layers of foreign objects and filtration aid alternate.

Furthermore, an oxidant line 114 opens into an oxidant entry opening 118 of the agglomerate collecting container 92. The oxidant line 114 can be used to introduce an oxidant, such as air or an oxygen-containing gas, schematically designated 112 in FIG. 4, into the agglomerate collecting container. The oxidant entry opening 118 includes a valve 116, whereby the supply of oxidant 112 to the agglomerate collection region 92 may be controlled or regulated. The valve 116 may be in the form of a flap valve or a disc valve, for example.

In particular, it may be provided to supply oxidant 112 to the agglomerate collection region 92 in timed relationship with the introduction of filtration aid into the agglomerate collecting container 92. In particular, it may be provided to supply oxidant to the agglomerate collecting container 92 after filtration aid has previously been introduced into the agglomerate collecting container 92. It may also be provided to supply oxidant to the agglomerate collecting container 92 before the agglomerate collecting container 92 is removed from the docking plate 98, for example for replacing a full agglomerate collecting container 92 with a new agglomerate collecting container. By supplying oxidant to the agglomerate collecting container 92, oxidation of material present in the agglomerate collecting container 92 is specifically promoted. This has the effect, on the one hand, that some of the combustible foreign objects present in the agglomerate collecting container 92 are converted into an inert oxidized form and, on the other hand, that the filtration aid is converted into a vitreous phase as a result of the heat generated during oxidation, whereby material still present in the agglomerate collecting container 92—whether combustible or not—is enclosed or trapped in a vitreous coating. This vitrification prevents the remaining combustible foreign objects from further contact with oxidant, thus converting the material in the agglomerate collecting container 92 to a harmless chemically inert configuration.

Alternatively or additionally, it is also possible to introduce oxidant 112 into the agglomerate collecting container 92 via the feed line 88, for example by way of an appropriate branch in the feed line 88 upstream of the agglomerate collecting container 92, in which case a separate oxidant entry opening 118 in the agglomerate collecting container 92 may not be required.

With the addition of oxidant 112, oxidation of filtered-off foreign objects in the agglomerate collecting container 92 can be purposefully triggered or initiated. The severity of this purposefully triggered oxidation reaction can be well controlled via the quantity and composition of oxidant 112 added. In addition, the filtration aid—which can be added in large quantities if necessary—absorbs excess heat energy and thereby vitrifies the existing reactive material in the agglomerate collecting container 92. In this manner, an effective and well-controllable possibility of converting combustible material into poorly reactive or inert and harmless material in the agglomerate collecting container 92 can be achieved. This increases the safety during operation of the filter device.

When the filter elements 14 are cleaned off, a pressurized gas is introduced into the filter elements 14 in a direction opposite to the direction of flow of the raw gas flow, whereby foreign objects are blasted off the filter element 14 by means of the pressure surge and fall into the agglomerate collecting container 92 via the lower housing region 18*b*. Once the filling level sensor 100 indicates that the agglomerate collecting container 92 has reached a predetermined maximum level, the discharge flap 96 is closed. Then, manually or by means of the control unit 110, the valve 94 is opened, the material diverter 86 is actuated, and the solids injector 80 is activated so that the filtration aid is transported from the storage container 72 into the agglomerate collecting container 92 via the connecting line 82, the material diverter 86, the feed line 88, the valve 94, and the docking plate 98. A supply of filtration aid into the agglomerate collecting container 92 takes place until a predetermined amount of filtration aid has been introduced into the agglomerate collecting container 92, which is ascertained on the basis of a decrease in weight of the storage container 72 as determined by the weight sensors in the holder 78. Preferably, the amount corresponds to a barrier layer of filtration aid of predetermined thickness, for example a barrier layer of filtration aid approximately 2 cm high in the agglomerate collecting container 92. Subsequently, the valve 94 is closed. Thereafter, an oxidant 112 may be introduced into the agglomerate collecting container 92 via an oxidant line 114 and an oxidant entry opening 118. When combustible foreign objects react with the oxidant 112, the filtration aid is heated to vitrify the foreign objects, thereby preventing further reaction of the foreign objects. The agglomerate collecting container 92 can be removed from the filter device 10 without the foreign objects in the agglomerate collecting container 92 self-igniting. The barrier layer of filtration aid ensures that the foreign objects in the agglomerate collecting container 92 do not self-ignite.

This is particularly true when the barrier layer has assumed a vitreous configuration, such as after exposure to heat in a fire. The agglomerate collecting container 92 can be lowered from the filter device 10 by a lifting and lowering device 99.

Another sequence for supplying filtration aid and oxidant is also possible, namely that oxidant is first introduced into the agglomerate collecting container 92 to cause the foreign objects to oxidize, and subsequently, when the oxidation reaction has occurred, a barrier layer of the filtration aid is applied to the oxidized foreign objects.

It may also be provided to introduce filtration aid and oxidant into the agglomerate collecting container 92 through a common opening. In other words, the filtration aid feed opening 90 as well as the oxidant entry opening 118 may be combined into a common opening. This results in a reduced number of inlet openings into the agglomerate collecting container 92.

The control unit 110 is connected via data lines or control lines, in particular, to the weight sensors 79, the solids injector 80, the valves 84, 94, the material diverter 86, and the discharge flap 96 in order to actuate or manipulate the same.

Figure 5:
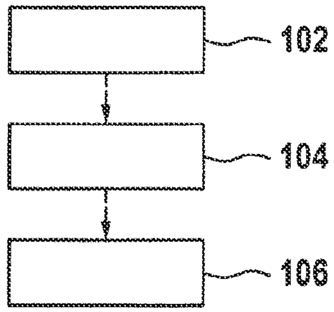
FIG. 5 shows a schematic flow diagram of a method according to the invention.

FIG. 5 schematically shows a process sequence for the dry filtration of a gas flow carrying foreign objects, or raw gas flow, in the filter device 10. The filter device 10 is used in particular for cleaning off exhaust air generated in additive manufacturing technologies, with the exhaust air constituting the raw gas. In this regard, in a step 102, the raw gas flow 44 is supplied to the filter unit 12 arranged in the filter device 10 via the raw gas inflow opening 16 and the raw gas space 15.

In this case, the raw gas flow 44 contains self-igniting foreign objects, such as powdery or chip-shaped metal dusts that tend to self-ignite when establishing contact with oxygen or under the action of mechanical energy. In a step 104, the filtration aid is supplied to the raw gas flow 44 and/or the filter element 14 via at least one of the filtration aid feed openings 20, 20' and 52, the filtration aid mixing with the foreign objects in the raw gas flow 44, thereby reducing the tendency to self-ignite. The softening point of the filtration aid is 500° C. or more. Once the softening point is exceeded, the filtration aid changes to a glassy or vitreous configuration and vitrifies the foreign objects through the associated phase change from an agglomerate of loosely accumulated solids to a uniform solid with a vitreous configuration. In other words, the filtration aid encloses the foreign objects with a glass layer, so that agglomerates of filtration aid and foreign objects are formed. A supply of oxidant to the foreign object(s) is thus effectively prevented.

Figure 6:
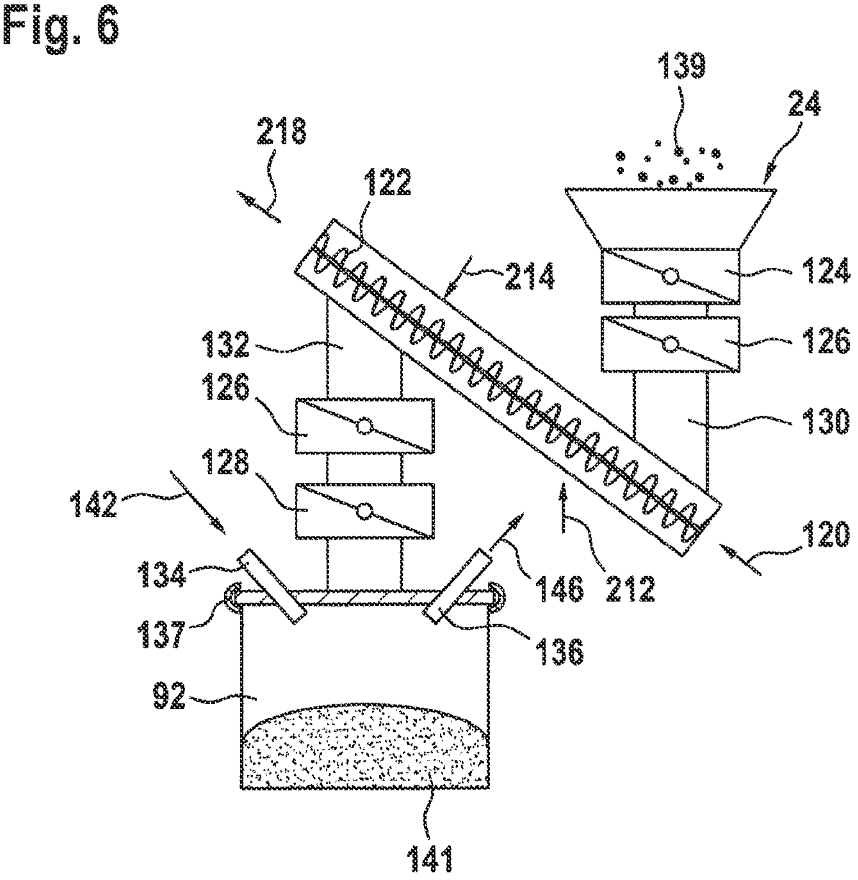
FIG. 6 shows an agglomerate collecting container connected to a filter device outlet via a reaction section. In the reaction section, there is arranged a screw conveyor for conveying material cleaned off from a filter surface.

FIG. 6 shows the agglomerate collecting container 92 which is connected to the collection region 24 of the filter device 10 via a reaction section 120, which in this case constitutes the reaction region. The reaction section 120 includes a transport member, in the present embodiment a screw conveyor 122, for conveying/transporting material cleaned off from a filter surface (referred to simply as cleaned-off material 139 in the following paragraphs). The reaction section 120 may have one or more shut-off members 124, 126, 128 associated therewith, which belong to respective closure or shut-off devices. The first shut-off member 124 and the optional shut-off member 126 are arranged between the collection region 24 and an inlet of the reaction section 120, the inlet being arranged at the beginning of the reaction section 120 in the direction of material flow, i.e. in the transport direction of the cleaned-off material 139 from the raw gas space of the filter device 10 to the agglomerate collecting container 92. The optional shut-off member 126, which is arranged downstream of the first shut-off member 124, enables the reaction section 120 to be safely closed off with respect to the collection region 24 of the filter device with the function of a lock, so that gas containing oxidant cannot enter the raw gas space 15. The cleaned-off material 139 falls from the collection region 24 through the shut-off member 124 into a front (upstream) part 130 of the reaction section 120, from where the cleaned-off material 139 is further conveyed by the screw conveyor 122. In the exemplary embodiment, the screw conveyor 122 is arranged to convey the cleaned-off material 139 from the front part 130 obliquely upward, for example at an angle between 20 and 80 degrees with respect to a horizontal plane. At the upper or downstream or "rear" end of the screw conveyor 122 in the direction of material flow, the cleaned-off material 139 falls into a rear or downstream part 132 of the reaction section 120. This rear part 132 is arranged above the agglomerate collecting container 92. Between the rear part 132 and the agglomerate collecting container 92, shut-off members 126 and 128 are connected in series in the direction of material flow, with one of these shut-off members being optional.

Optionally, an oxidant inlet 212 may be disposed in the reaction section 120 in the region of the screw conveyor 122. Through this oxidant inlet 212, oxidant can be introduced into the reaction section 120, i.e. into the region of the screw conveyor 122, where it is mixed with the cleaned-off material 139 transported by the screw conveyor 122 and causes an oxidation reaction of the cleaned-off material 139. This oxidizes the cleaned-off material 139 into a poorly reactive or inert material 141. In addition to the oxidant, a poorly reactive or inert fluid (e.g. nitrogen ($N_2$)) may also be introduced via the oxidant inlet 212, primarily to remove heat generated during the reaction. A waste gas outlet 218 is disposed at the downstream end of the screw conveyor 122 through which excess oxidant is discharged from the reaction section 120 along with heat, oxidant residues such as soot, and other substances generated during oxidation. Introducing the oxidant into the screw conveyor 122 has the advantage that no fluidization by an oxidant flow is necessary, because the mixing of the cleaned-off material 139 with the oxidant occurs mechanically through the screw conveyor 122. Thus, no batchwise metering of the cleaned-off material 139 is necessary, since only a small portion of the cleaned-off material 139 can react with the oxidant at any given time. In other words, continuous oxidation can be realized hereby. Furthermore, a filtration aid inlet 214, which may also be referred to as a filtration aid entry, may be arranged in the reaction section 120 such that filtration aid or extinguishing agent may be introduced into the reaction section 120 in the region of the screw conveyor 122. In the embodiment shown in FIG. 6, the filtration aid inlet 214 is located downstream of the oxidant inlet 212. The addition of filtration aid thus serves primarily as a safeguard to ensure that the highly exothermic oxidation reaction does not get out of control, as well as to dissipate heat.

The shut-off members 124, 126, 128 allow the flow of cleaned-off material 139 passing through the reaction section at any given time to be controlled and thus influence the heat generated when cleaned-off material 139 reacts with oxidant 142. In some embodiments, control of the shut-off members and/or the heat transfer fluid flow may be sufficient in itself to control the temperature generated, thereby eliminating the need for further addition of filtration aid. A further aspect of the shut-off members, in particular shut-off members 124 and optionally 126, is that no oxidant can enter the filter device 10, in particular the raw gas space 15, from the reaction section 120.

In FIG. 6, the agglomerate collecting container 92 additionally has a gas inlet 134, identified as an air inlet, and a gas outlet 136, identified as an air outlet. In particular, the gas inlet 134 and the gas outlet 136 are disposed in a cover 137 arranged at the rear part 132 of the reaction section 120. The agglomerate collecting container 92 is attached to the cover 137 such that no fluid or solids can escape at a transition between the agglomerate collecting container 92 and the cover 137. Oxidant is introduced into the agglomerate collecting container 92 through the gas inlet 134 to allow the cleaned-off material 139 to react with the oxidant to form a poorly reactive or inert material 141. This reaction generates heat, which is removed from the agglomerate collecting container 92 by the oxidant flow from the gas outlet 136. Filtration aid can also be introduced into the agglomerate collecting container 92 through the gas inlet 134. This configuration of the agglomerate collecting container 92 may provided in addition or as an alternative to the configuration of the reaction section described above.

The shut-off members 124, 126, 128 allow the reaction section 120 to be delimited from the collection region 24 and the agglomerate collecting container 92. In particular, they enable specific control of the amount of oxidizable material present in the reaction region per unit of time and thus of the heat of reaction generated per unit of time. As soon as the shut-off members 124, 126, 128 ensure that at least the first closure means and optionally also the second closure means is closed, oxidant can be introduced into the reaction section 120 through the oxidant inlet 212. The shut-off members 124, 126, 128 may preferably be in the form of a shut-off valve, a flap, a slide, a door, or a pinch valve. A pinch valve has an elastic tube which, for reducing flow through the tube, is compressed or squeezed, thereby reducing a diameter of the elastic tube. For example, the screw conveyor 122 may be formed like an Archimedes screw.

It is particularly favorable if the shut-off members 124, 126 at the upstream end and/or the shut-off members 128, 126 at the downstream end of the reaction section 120 are configured to have the function of a lock. Then, the reaction section 120 can become independent of the operating state of the first closure means at the upstream end and the operating state of the second closure means at the downstream end, respectively, with respect to the passage of oxidant into the raw gas space 15 or into an agglomerate collecting container 92 arranged downstream, respectively. This allows oxidants to be continuously introduced into the reaction section 120 without the need for synchronization with the shut-off member of the first and second closure means, respectively. Such a lock function is particularly advantageous for the first closure means at the upstream end of the reaction section 120, because oxidant can thus be prevented from entering the raw gas space 15. The lock function can be realized, for example, by the first closure means and/or the second closure means having in the instant case two shut-off members 124, 126 and 126, 128, respectively, arranged one after the other.

Figure 7:
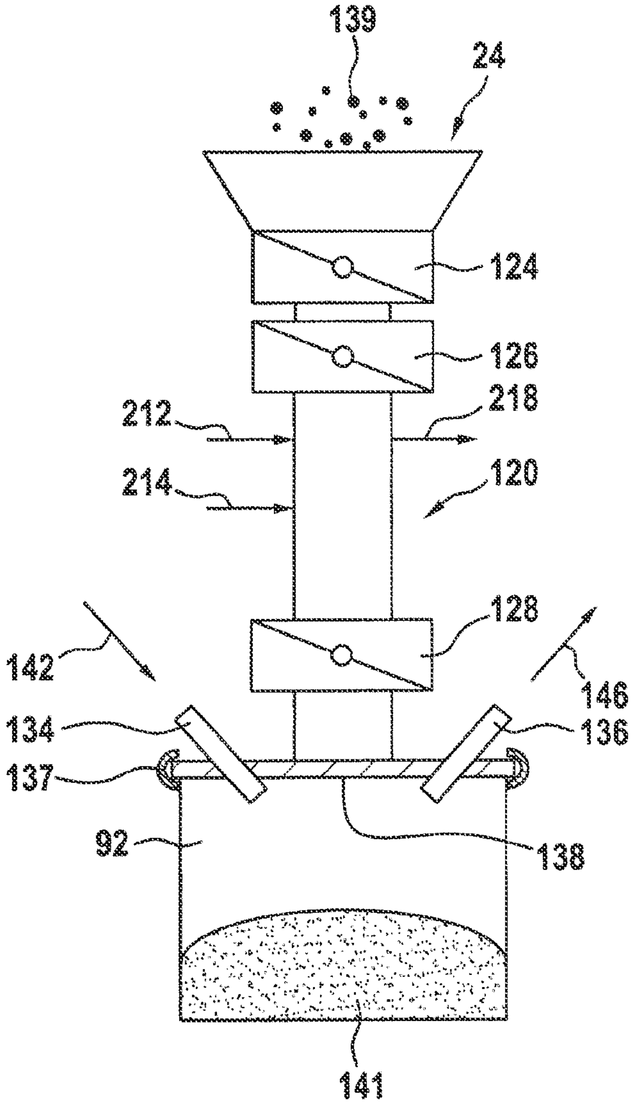
FIG. 7 shows an agglomerate collecting container which is connected to a filter device outlet via a reaction section. Two shut-off members are arranged in the reaction section.

FIG. 7 shows another possible embodiment of the reaction section 120 between the collection region 24 and the agglomerate collecting container 92. The reaction section 120 is located between the shut-off members 124 and 128, which delimit the reaction section 120 between a reaction section inlet and a reaction section outlet. The reaction section 120 has a slope between the first shut-off member 124 at the reaction section inlet and the second shut-off member 128 at the reaction section outlet. In the example shown, the slope is vertical, but it could also be inclined at any angle. Furthermore, the reaction section 120 may comprise the oxidant inlet 212, the filtration aid inlet 214, and the waste gas outlet 218, see also FIG. 6. In the direction of material flow of the cleaned-off material 139, the filtration aid inlet 214 may be located downstream of the oxidant inlet 212. Furthermore, the oxidant inlet 212 and the filtration aid inlet 214 are arranged on a first side of the reaction section 120, and the waste gas outlet 218 is arranged on a second side of the reaction section, the second side preferably being located opposite the first side. An inverse arrangement is also possible. Downstream of the shut-off member 124 is the optional shut-off member 126 in the direction of material flow, wherein the optional shut-off member 126 is arranged upstream of the oxidant inlet 212, upstream of the filtration aid inlet 214 and upstream of the waste gas outlet in the direction of material flow.

As is also shown in FIG. 6, the agglomerate collecting container 92 is located at the reaction section exit. The gas inlet 134 forms an oxidant inlet, and the gas outlet 136 forms an oxidant outlet. The gas inlet 134 and the gas outlet 136 are formed as shown in FIG. 6. In this case, the gas inlet 134 and the gas outlet 136 are arranged in the cover 137 such that they are disposed on different sides of a material inlet 138 through which the cleaned-off material 139 is introduced into the agglomerate collecting container 92. This arrangement of the gas inlet 134 and gas outlet 136 is particularly advantageous as air or oxidant flows through a material flow of the cleaned-off material 139. This allows the material, which is still highly reactive at this point, to be converted into a poorly reactive or inert material 141 using controlled oxidation. This inert material is then stored in the agglomerate collecting container 92 and can be safely removed from the agglomerate collecting container 92 by service personnel, or disposed of along with the agglomerate collecting container 92 if the agglomerate collecting container 92 is configured as a disposable container. Additionally, filtration aid or extinguishing agent may be introduced into the agglomerate collecting container 92 through the gas inlet 134, thereby separating the inert material 141 from ambient air when the agglomerate collecting container 92 is removed.

The reaction section 120 and the agglomerate collecting container 92 each form part of a reaction region. This reaction region may be located in portions of both the reaction section 120 and the agglomerate collecting container 92, or may be located in only one portion thereof.

In FIG. 7, the reaction section 120 is oriented such that the cleaned-off material 139 falls by gravity into the agglomerate collecting container 92 through a tube oriented perpendicular to a cover plane in which the cover 137 is disposed. This tube may also be oriented obliquely to the cover plane as long as the material in the tube reaches the agglomerate collecting container 92 without getting caught in the tube, preferably at an angle between 20 to 90 degrees with respect to the cover plane.

Figure 8:
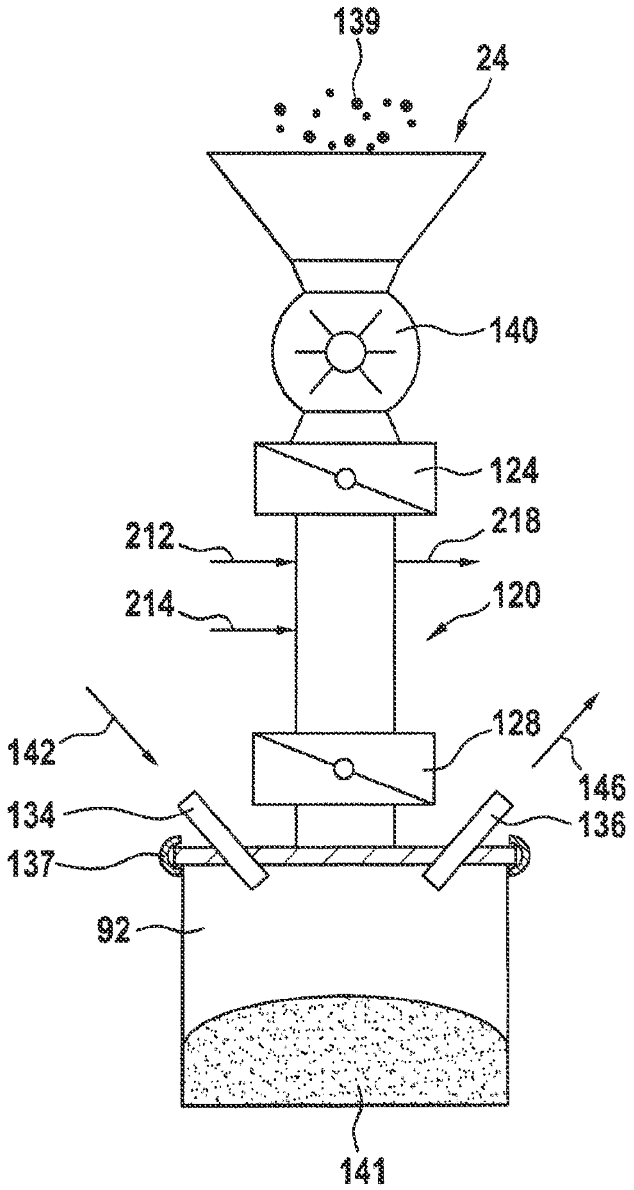
FIG. 8 shows an agglomerate collecting container which is connected to a filter device outlet via a reaction section. A rotary valve is arranged in the reaction section and two shut-off members are arranged downstream thereof, one behind the other in the direction of flow.

FIG. 8 shows another exemplary embodiment. Also in FIG. 8, the reaction section 120 connects the collection region 24 to the agglomerate collecting container 92. In this embodiment, the first closure means has a rotary valve 140 located upstream of the reaction section 120 in the direction of material flow. The rotary valve 140 is followed by a further shut-off member 124, which is optional in this case. The shut-off member 128 follows the reaction section 120. Once the cleaned-off material 139 has passed the shut-off member 128, it falls into the agglomerate collecting container 92. Unless otherwise indicated, identical elements are provided with the same reference numerals. That is, the cover 137 also comprises the gas inlet 134 and the gas outlet 136.

The rotary valve 140 allows control of the material flow of the cleaned-off material 139, and thus control and/or influence the amount of heat generated when the cleaned-off material reacts with air or oxidant. The rotary valve 140 has an axis of rotation about which a blade wheel is rotatable, the rotation of the blade wheel being controllable by the control unit 110. In the embodiment, the axis of rotation is oriented horizontally. However, other orientations of the axis of rotation are possible as well.

Furthermore, the reaction section 120 may include the oxidant inlet 212, the filtration aid inlet 214, and the waste gas outlet 218, see also FIG. 6. In the material flow direction of the cleaned-off material 139, the filtration aid inlet 214 may be located downstream of the oxidant inlet 212. Moreover, the oxidant inlet 212 and the filtration aid inlet 214 are arranged on a first side of the reaction section 120, and the waste gas outlet 218 is arranged on a second side of the reaction section, the second side preferably being opposite the first side. An inverse arrangement is also possible.

Figure 9:
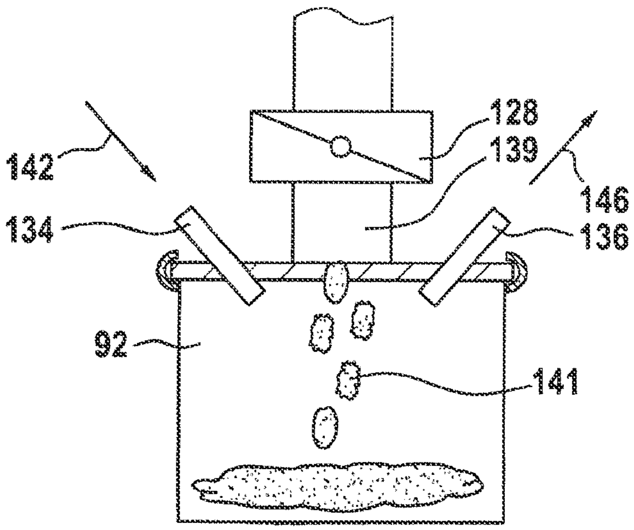
FIG. 9 shows a material cleaned off from a filter surface, which is conducted through a shut-off member into an agglomerate collecting container and in doing so crosses an oxidant flow.

FIG. 9 shows the rear part 132 of the reaction section 120 with the shut-off member 128 and the agglomerate collecting container 92 arranged downstream in the direction of material flow. FIG. 9 shows schematically how the cleaned-off material 139 falls into the agglomerate collecting container 92 from the direction of the shut-off member 128. As it does so, the falling cleaned-off material 139 crosses the oxidant flow 142 flowing from the gas inlet 134 to the gas outlet 136. As it falls through the oxidant flow 142, the cleaned-off material 139 reacts with the oxidant, thereby being converted to a poorly reactive inert and/or inert material 141. The heat generated by the reaction is removed through the gas outlet 136 along with the oxidant flow, which as a rule contains a mixture of oxidant, e.g. oxygen, and an inert component, e.g. nitrogen or inert gas. The cleaned-off and now inert material 141 collects at the bottom of the agglomerate collecting container 92. To further increase safety, filtration aid, hereinafter also referred to as extinguishing agent, which suppresses the formation or propagation of flames, may be admitted to the agglomerate collecting container 92 through the gas inlet 134 or through a separate filtration aid inlet not shown. The filtration aid reduces the concentration of combustible material that may still be present in the inert material 141 and provides for contact of residual combustible material with oxidant by turbulence, so that an as complete as possible conversion is effected. The filtration aid also assists in the absorption of heat of reaction. The filtration aid may be introduced into the agglomerate collecting container 92 at timed intervals so that layers of inert material 141 and filtration aid alternate in the agglomerate collecting container 92. Once the agglomerate collecting container 92 is sufficiently filled, the service personnel is informed that the agglomerate collecting container 92 can be removed or emptied. Thereafter, a new agglomerate collecting container 92 or the previous agglomerate collecting container 92 can again be arranged at the reaction section 120 and filled with inert material 141.

Figure 10:
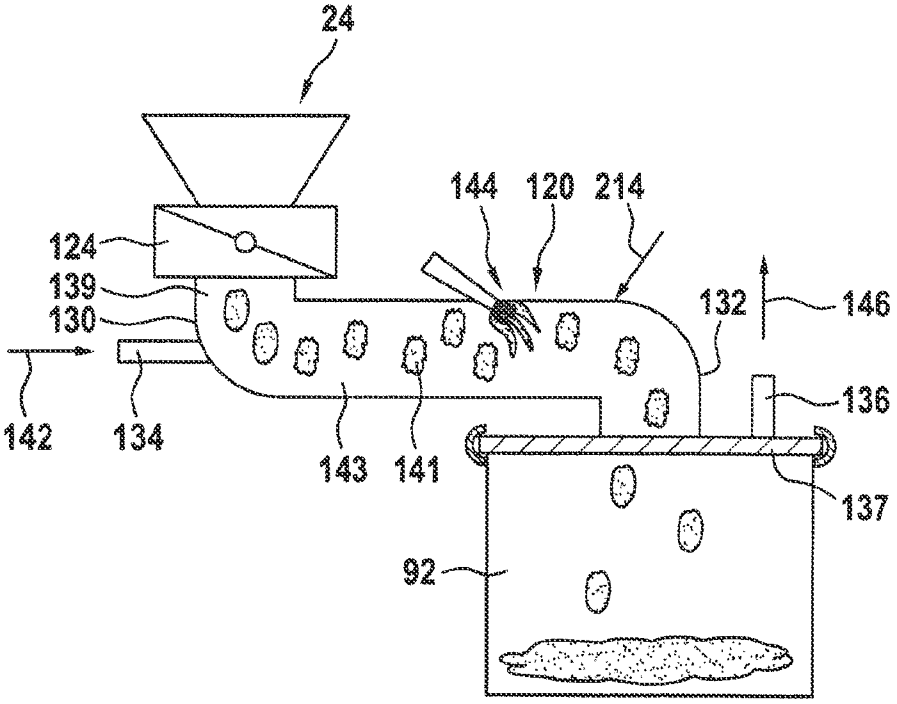
FIG. 10 shows an agglomerate collecting container connected to a filter device outlet via a reaction section. The reaction section has a shut-off member. Downstream of the shut-off member is an oxidant inlet and further downstream an ignition device is arranged in the reaction section.

FIG. 10 shows another exemplary embodiment. In this case, the reaction section 120 has an S-shaped configuration. Between the collection region 24 and the front part 130 of the reaction section 120, the first shut-off member 124 is arranged in order to control the flow of the cleaned-off material. The gas inlet 134, through which oxidant or air can be introduced into the reaction section 120, is also arranged in the front part 130. In particular, the gas inlet 134 is arranged such that the oxidant flow can be introduced into the reaction section 120 coaxially with a central part 143 of the reaction section 120. Thus, the cleaned-off material 139 can already react in a first step. In the event that the cleaned-off material 139 reacts only poorly or partially with the oxidant 142, an ignition source 144 is arranged in the central part 143 of the reaction section 120. This ignition source 144 provides an external energy input to the mixture of cleaned-off material 139 and oxidant, so that the cleaned-off material 139 is oxidized and thus converted into inert material 141. Furthermore, downstream of the ignition source 144, filtration aid or extinguishing agent may be introduced into the flow of inert material 141 via the filtration aid inlet 214. This material 141, which is now poorly reactive or inert, falls into the agglomerate collecting container 92. The gas outlet 136 is arranged at the cover 137. Through the gas outlet 136, the excess oxidant is discharged from the agglomerate collecting container 92 along with reaction heat and oxidation residues generated during oxidation of the cleaned-off material.

The reaction section 120 of FIG. 10 has a vertical orientation in the front part 130, then transitions to the horizontally oriented central part 143, and then returns to a vertical orientation in the rear part 132. This means that the cleaned-off material from the collection region 24 first falls through the shut-off member 124 into the front vertical part 130 of the reaction section 120. Then, this material is conveyed by means of the oxidant flow from the gas inlet 134 through the central horizontal part 143 of the reaction section 120. In the rear vertical part 132 of the reaction section 120, the cleaned-off material then falls by gravity into the agglomerate collecting container 92.

The reaction section 120 may also be referred to as the waste reaction section. This means that in this section cleaned-off material reacts with oxidant in controlled manner, such that uncontrolled ignition of the cleaned-off material is avoided.

Figure 11:
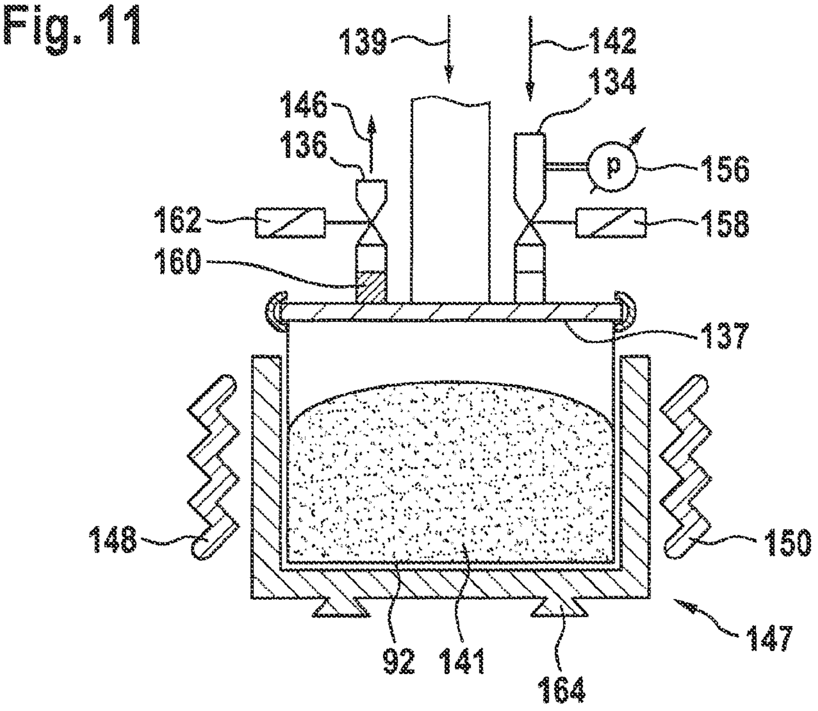
FIG. 11 shows an agglomerate collecting container with a conditioning element (heating and/or cooling element) arranged on its outer wall.

FIG. 11 shows the agglomerate collecting container 92 located in a conditioning device 147, which can both heat and cool the agglomerate collecting container 92. This device has a temperature control element 148, 150 which can be a heating element and/or a cooling element. The gas inlet 134 and a gas outlet 136 are disposed on the cover 137 of the agglomerate collecting container 92. A pressure indicator 156 and a solenoid valve 158 are associated with the gas inlet 134. With the aid of the pressure indicator 156, the service personnel can check whether pressurized gas is present at the gas inlet 134 or not. With the aid of the solenoid valve 158, the oxidant supply to the agglomerate collecting container 92 can be quickly and easily checked or controlled. A filter element 160 and a second solenoid valve 162 are associated with the gas outlet 136. The solenoid valve 158 and the solenoid valve 162 can be controlled by the control device 110 not shown in FIG. 11. The solenoid valves 158 and 162 can be used to easily and reliably control the supply of oxidant 142 to the agglomerate collecting container 92. Once the oxidant reacts with the cleaned-off material 139 in the agglomerate collecting container 92, the oxidant flow will have foreign matter such as soot or other contaminants and carry them out of the agglomerate collecting container 92. To avoid this, the filter element 160 is disposed in the gas outlet 136. Soot and foreign objects contained in the oxidant flow are filtered out in the filter element 160, so that the oxidant flow can be safely discharged into the environment after leaving the gas outlet 136.

The conditioning device 147 comprises a container having the configuration of the agglomerate collecting container 92. The container further includes two or more feet 164 attached to a bottom side of the container.

Figure 12:
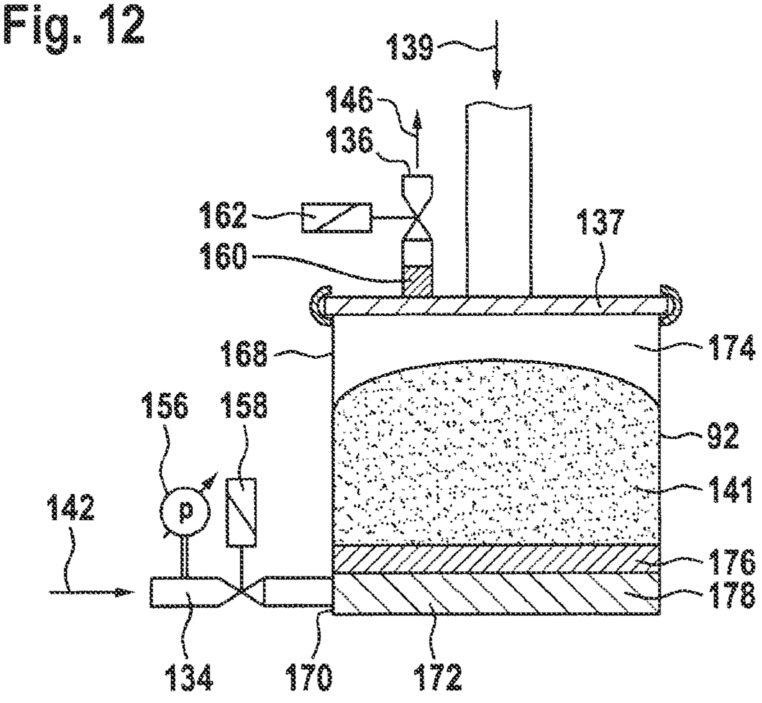
FIG. 12 shows an agglomerate collecting container which has an oxidant port in a region directed towards the bottom, through which oxidant can be introduced into the agglomerate collecting container below the material cleaned off from a filter surface.

FIG. 12 shows the agglomerate collecting container 92 with the gas inlet 134 disposed on a sidewall 168 of the agglomerate collecting container 92, preferably in a lower region 170 of the sidewall 168. In particular, the lower region 170 is a lower half of the sidewall 168 of the agglomerate collecting container 92 as viewed from a bottom 172 of the agglomerate collecting container 92. The pressure indicator 156 and the solenoid valve 158 are arranged at the gas inlet 134. However, any other type of valve may be used. A fluidizing plate 176 is disposed in an interior space 174 of the agglomerate collecting container 92, said interior space 174 being formed by the bottom 172 and the sidewall 168. The fluidizing plate 176 is positioned such that an intermediate space 178 is formed between the bottom 172 and the fluidizing plate 176. The gas inlet 134 is in fluid communication with the intermediate space 178, and the cleaned-off material 139 remains on the fluidizing plate 176 as it falls into the interior space 174 so that the oxidant, which is passed through the gas inlet 134 into the intermediate space 178, through the fluidizing plate 176 and then through the cleaned-off material 139 to the gas outlet 136, can react with the cleaned-off material 139. The thus inerted material 141 is poorly reactive and allows safe handling by service personnel. The gas outlet 136 is disposed in the cover 137 of the agglomerate collecting container 92. The gas outlet 136 comprises a filter 160 and the downstream solenoid valve 162 in the direction of flow, see also FIG. 11.

With these exemplary embodiments, good mixing of the oxidant with the cleaned-off material is possible.

Figure 13:
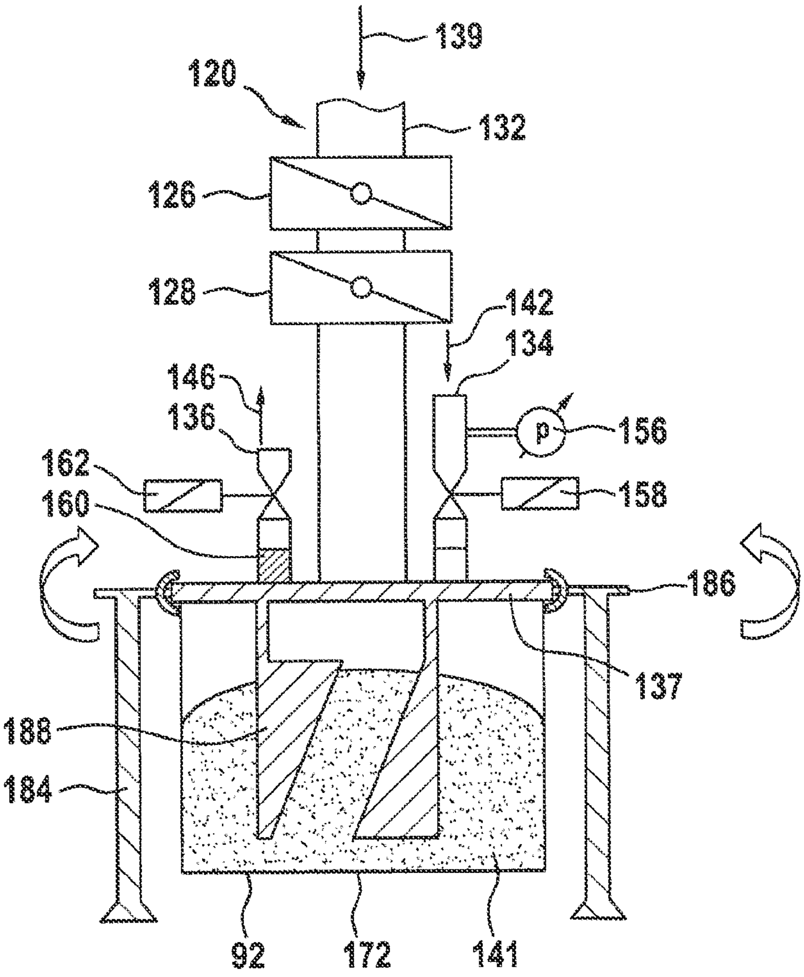
FIG. 13 shows an agglomerate collecting container with one or more mixer arms which move material cleaned off from a filter surface in the agglomerate collecting container and thus effect advantageous mixing of the material with oxidant.

FIG. 13 shows a further embodiment. In FIG. 13, the agglomerate collecting container 92 is arranged on a rotating device 184. The agglomerate collecting container 92 has an axis of rotation 186 aligned parallel to the plane of the cover, about which the agglomerate collecting container 92 is rotatable. The cover 137 of the agglomerate collecting container 92 includes the gas inlet 134 and the gas outlet 136, as well as the pressure indicator 156, the solenoid valve 158, the filter 160, and the solenoid valve 162, see FIG. 11. Furthermore, the cover 137 comprises the material inlet 138. At an end of the material inlet 138 remote from the cover, the second shut-off device with shut-off members 126, 128 is arranged. The rear part 132 of the reaction section 120 can be closed by the shut-off member 126. The shut-off member 126 and the shut-off member 128 form a lock. In order to be able to rotate the agglomerate collecting container 92 about the axis of rotation 186 by means of the rotating device 184, it may be provided that at least one of the shut-off members 126, 128 is closed and that the agglomerate collecting container 92 is uncoupled from the reaction section 120 so that the agglomerate collecting container 92 can be rotated about the axis of rotation 186. If the agglomerate collecting container 92 is only pivoted in the rotating device 184, i.e. when no complete rotation about the axis of rotation 186 is necessary, it may be sufficient to connect the transport section to the agglomerate collecting container 92 by a flexible connection, in particular a flexible hose.

The cover 137 includes two stirring blades 188 extending from a bottom side of the cover 137 to the bottom 172 of the agglomerate collecting container 92, but preferably not contacting the bottom 172. The stirring blades 188 are configured to agitate the cleaned-off material 139 that has accumulated in the agglomerate collecting container 92, thereby enabling better mixing of the cleaned-off material 139 with the oxidant and/or filtration aid. In particular, the filtration aid may be an extinguishing agent and will also be referred to as extinguishing agent in the following. To enable mixing of the oxidant with the cleaned-off material 139, additionally or alternatively, a motor not shown and adapted to move the stirring blades 188 may be disposed in the cover to move the agglomerate collecting container 92 about the axis of rotation 186. The heat of reaction generated by the reaction of the cleaned-off material with the oxidant is discharged or dissipated from the gas outlet 136 with the oxidant flow. In addition, it may also be provided here that filtration aid is supplied.

Figure 14:
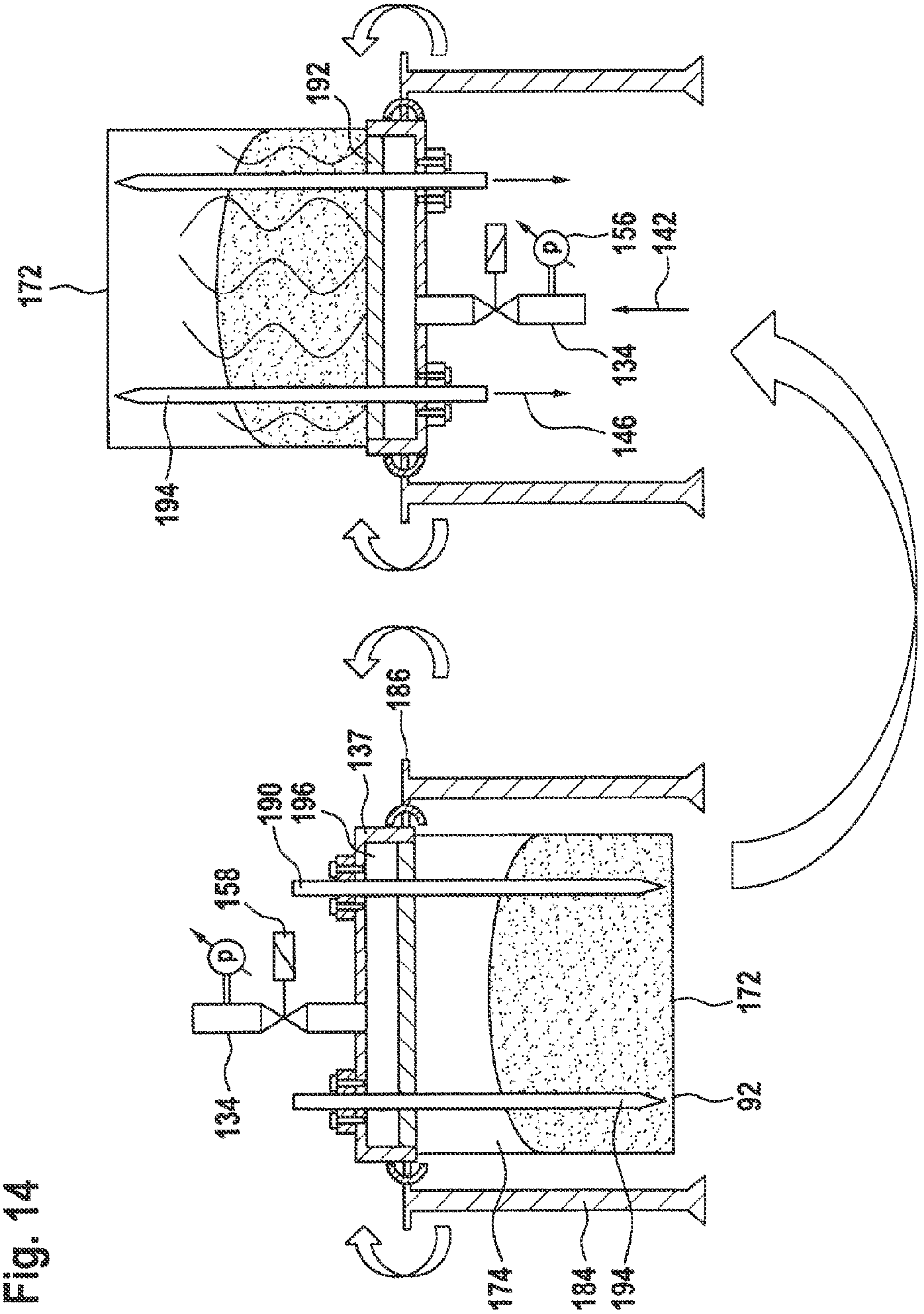
FIG. 14 shows an agglomerate collecting container which is rotatable at a rotation axis, in particular rotatable about a horizontal rotation axis, so that material cleaned off from a filter surface is mixed with oxidant.

FIG. 14 shows another embodiment for mixing cleaned-off material 139 with oxidant 142. For simplicity of FIG. 14, no material inlet is shown in the cover 137. However, it is understood that such inlet will be provided in reality. In FIG. 14, the agglomerate collecting container 92 is mounted in the rotating device 184 so as to be rotatable about the axis of rotation 186. The gas inlet 134 is disposed in the cover 137. Further, the cover 137 comprises two hollow lances 190 that allow fluid communication between the interior space 174 of the agglomerate collecting container 92 and an environment of the agglomerate collecting container 92. The lances 190 extend to the bottom 17 of the agglomerate collecting container 92 without contacting the bottom 172. At the end of the lances 190 facing the bottom 172, the lances 190 each include an opening 194 through which a mixture 146 of oxidant and oxidant residues can escape. Once a predetermined amount of cleaned-off material 139 is stored in the agglomerate collecting container 92, the agglomerate collecting container 92 is rotated about the axis of rotation 186 through about 180° so that the cleaned-off material is no longer deposited on the bottom 172, but is deposited on a fluidizing plate 192 disposed near the cover 137 of the agglomerate collecting container 92. Then, the oxidant 142 in the form of pressurized gas is introduced through the gas inlet 134 into the interior space 174 of the agglomerate collecting container 92 through the fluidizing plate 192. This causes the cleaned-off material to react and become poorly reactive or inert. The mixture 146, particularly a mixture of gas and smoke, is discharged from the agglomerate collecting container 92 through the opening 194, along with heat. The fluidizing plate 192 is arranged in the agglomerate collecting container 92 such that an intermediate space 196 is formed between the cover 137 and the fluidizing plate 192. The gas inlet 134 is arranged in the cover 137 such that the oxidant 142 is first introduced into the intermediate space 196, and then uniformly passes through the fluidizing plate 192 into the agglomerate collecting container 92 or into the interior space 174 of the agglomerate collecting container 92.

Figure 15:
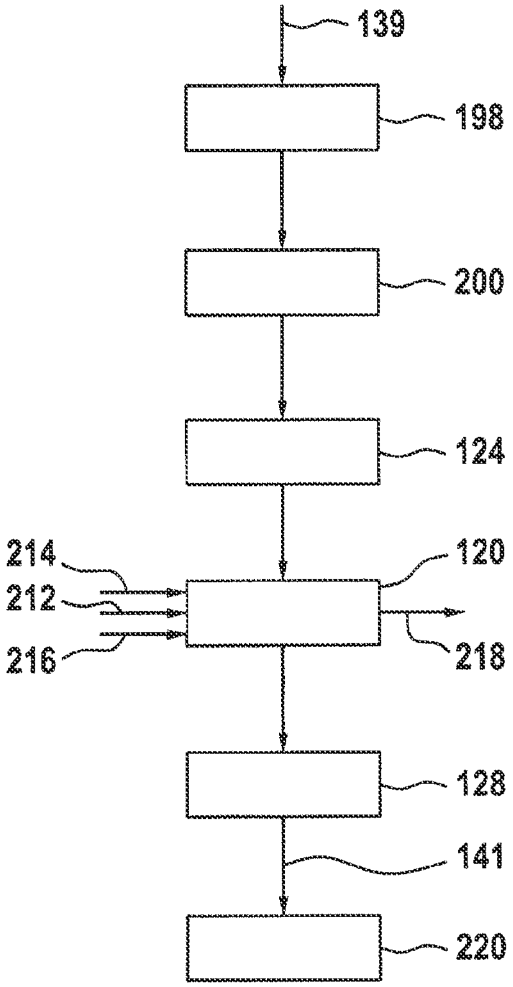
FIG. 15 shows a schematic view of a reaction section.

FIG. 15 shows a general layout of the reaction region. At the upstream end is a raw gas space 198 of the filter device 10, followed in the direction of material flow of cleaned-off material 139 by an optional metering member 200, the first shut-off device with shut-off member 124 (and optionally shut-off member 126), the reaction section 120, and the second shut-off device with shut-off member 128 (and optionally shut-off member 126). A disposal region 220 follows the reaction section 120. For example, the agglomerate collecting container 92 may be provided in the disposal region 220. All parts downstream of the first shut-off device form the discharge region, in particular the reaction section 120 and the agglomerate collecting container 92. The reaction section 120 comprises the oxidant inlet 212, through which the oxidant 142 can be introduced into the reaction section 120. Furthermore, the filtration aid inlet 214 may be formed in the reaction section 120 through which the extinguishing agent may be introduced into the reaction section. Furthermore, the reaction section 120 may include a heat or ignition source 216 that provides an energy input to the reaction section 120 to initiate oxidation of the cleaned-off material 139 with oxidant. Additionally, the reaction section 120 comprises the waste gas outlet 218 through which the mixture of oxidant and oxidation residues, along with heat, exits the reaction section 120. During operation, the cleaned-off material 139 is introduced into the reaction section 120. Once the shut-off members 124 and 128 are closed, the oxidant 142 and optionally filtration aid or extinguishing agent is introduced into the reaction section 120. The cleaned-off material 139 then oxidizes and becomes the poorly reactive or inert material 141. After the reaction is complete, the shut-off member 128 of the second shut-off device is opened and the inert material 141 is discharged into the disposal region 220.

Figure 16:
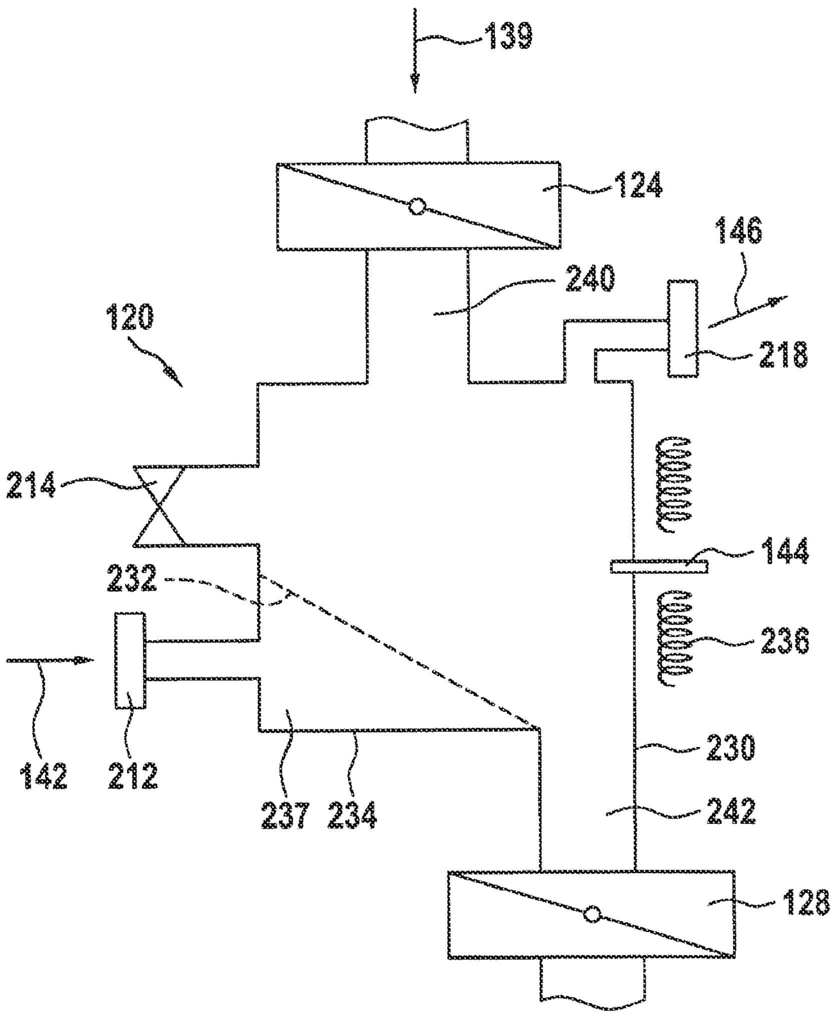
FIG. 16 shows a reaction space for oxidation of cleaned-off material.

FIG. 16 shows another embodiment of the reaction section 120. A material inlet 240 is formed at a first, upper end of the reaction section 120, through which the cleaned-off material is introduced into the reaction section 120. The shut-off member 124 of the first shut-off device is arranged at the material inlet 240. At the lower end of the reaction section 120, the shut-off member 128 of the second shut-off device is arranged and closes a material outlet 242. The poorly reactive or inert material is discharged from the reaction section 120 through the material outlet 242. The reaction section 120 includes a sidewall 230. The sidewall 230 encloses the reaction section 120, thereby forming the reaction section 120. The filtration aid inlet 214 is formed on the sidewall 230 in an upper portion of the reaction section 120. The oxidant inlet 212 is arranged below the filtration aid inlet 214 in the direction of material flow. In this regard, the inlets 214 and 212 are arranged such that the filtration aid and the oxidant, respectively, are introduced into the reaction section 120 at approximately right angles to the direction of material flow of the cleaned-off material 139. The order of oxidant inlet 212 and filtration aid inlet 214 could also be reversed, and the injection could also be effected at a different angle to the direction of material flow. Further, a fluidizing plate 232 is disposed in the reaction section 120. The fluidizing plate 232 is formed as a perforated plate or a fine mesh. The fluidizing plate 232 extends from the sidewall 230 into the reaction section 120. In particular, the fluidizing plate 232 is arranged to be located upstream of the oxidant inlet 212. The fluidizing plate 232 is arranged in the reaction section 120 such that it is disposed between the filtration aid inlet 214 and the oxidant inlet 212. From there, the fluidizing plate 232 extends obliquely downward toward a bottom 234 of the reaction section 120, the bottom 234 being formed below the oxidant inlet 212 in the direction of material flow. In the bottom 234, the material outlet 242 is arranged off-center in the present embodiment, in a portion of the reaction section 120 located opposite the oxidant inlet 212 and the filtration aid inlet 214. A temperature control element 236, preferably a heating element, is integrated in a portion of the sidewall 230 located opposite the oxidant inlet 212 and the filtration aid inlet 214, in order to accelerate or start at all an oxidation reaction in the reaction section 120. Additionally, the ignition source 144 may be arranged in the reaction section 120, in particular adjacent the temperature control element 236. In operation, the cleaned-off material 139 falls through the shut-off member 124 into the reaction section 120 and impinges on the fluidizing plate 232. The oxidant 142, introduced into the reaction section 120 through the oxidant inlet 212, via an intermediate space 238 through the fluidizing plate 232, flows through the fluidizing plate 232 and mixes with the cleaned-off material 139 so that the desired oxidation takes place efficiently. Once the cleaned-off material 139 is oxidized, it falls out through the shut-off member 128 at the lower end of the reaction section 120 toward the agglomerate collecting container 92, which is not shown.

Figure 17:
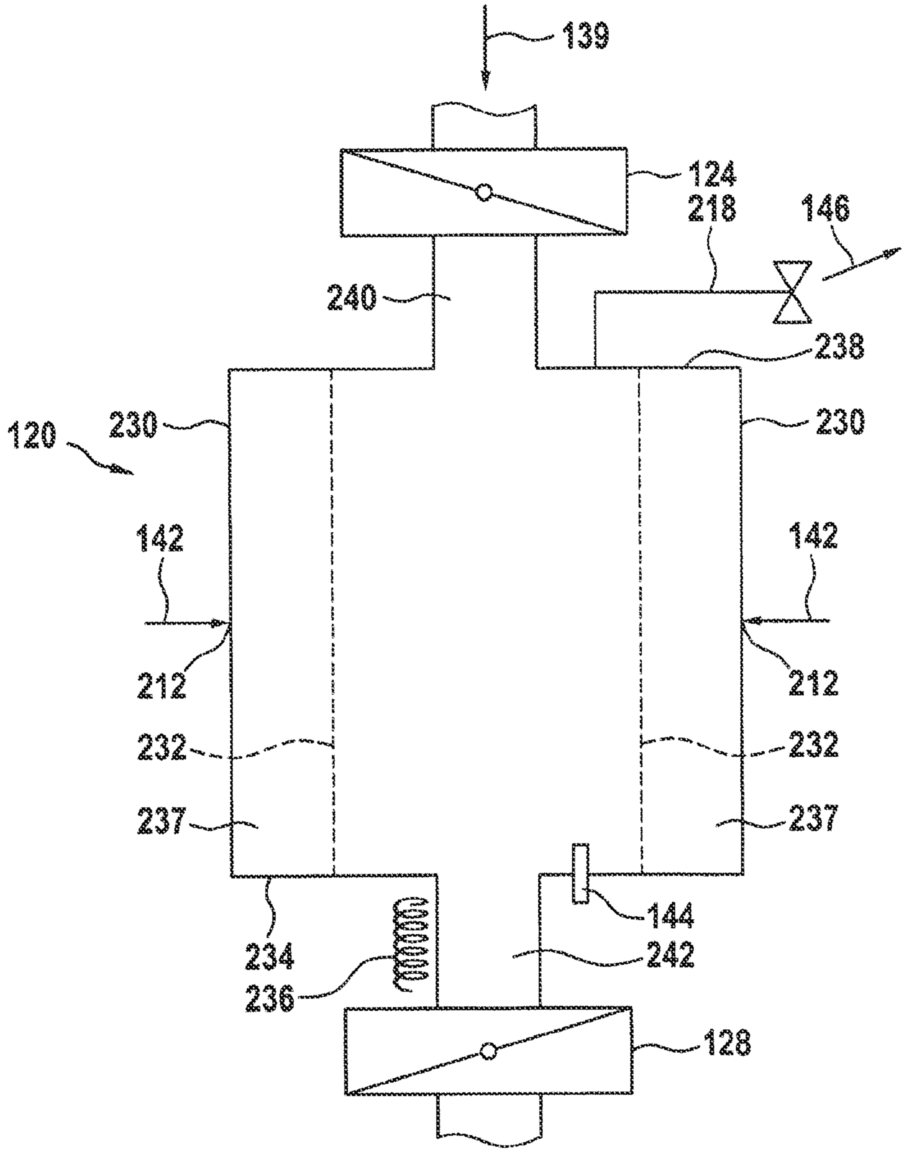
FIG. 17 shows another example of a reaction space.

FIG. 17 shows another exemplary embodiment of a reaction section 120. Here, too, the material inlet 240 is arranged at the upper end of the reaction section 120 and the material outlet 242 is arranged at the lower end of the reaction section 120. The material inlet 240 and the material outlet 242 are preferably arranged along a common axis. The reaction section is bulbous in the radial direction, such that the diameter of the material inlet is smaller than the larger diameter of the reaction section 120. The reaction section 120 includes a ceiling 238 arranged at the upper end of the reaction section 120 and the bottom 234 arranged at the lower end of the reaction section 120. The fluidizing plate 232 is disposed in the reaction space 210, extending from the ceiling 238 to the bottom or floor 234. Thus, in this exemplary embodiment, the fluidizing plate 232 extends substantially in the direction of material flow. In the example shown, the fluidizing plate 232 has a cylindrical or frustoconical shape. Between the sidewall 230 and the fluidizing plate 232 is the intermediate space 237, in which the oxidant 142 can be uniformly distributed. The oxidant inlet 212 is arranged at the sidewall 230, through which the oxidant 142 can be introduced into the intermediate space. The oxidant then passes from the intermediate space 237 into the reaction space 210 which contains the cleaned-off material. By introducing the oxidant 142 laterally through the fluidizing plate 232, the cleaned-off material can be uniformly mixed with the oxidant 142 so that a particularly efficient oxidation reaction can occur.

Preferably, the temperature control element 236 may be disposed about the material outlet 242. However, it is also possible to arrange the temperature control element 236 at another location in the reaction section 120. It fulfills the same function here as in FIG. 16. Furthermore, the ignition source 144 can project into the reaction section 120.

In addition, the waste gas outlet 218 is arranged in the ceiling 238, through which the mixture of oxidant and oxidation residues as well as heat can be discharged from the reaction section 120.

Figure 18:
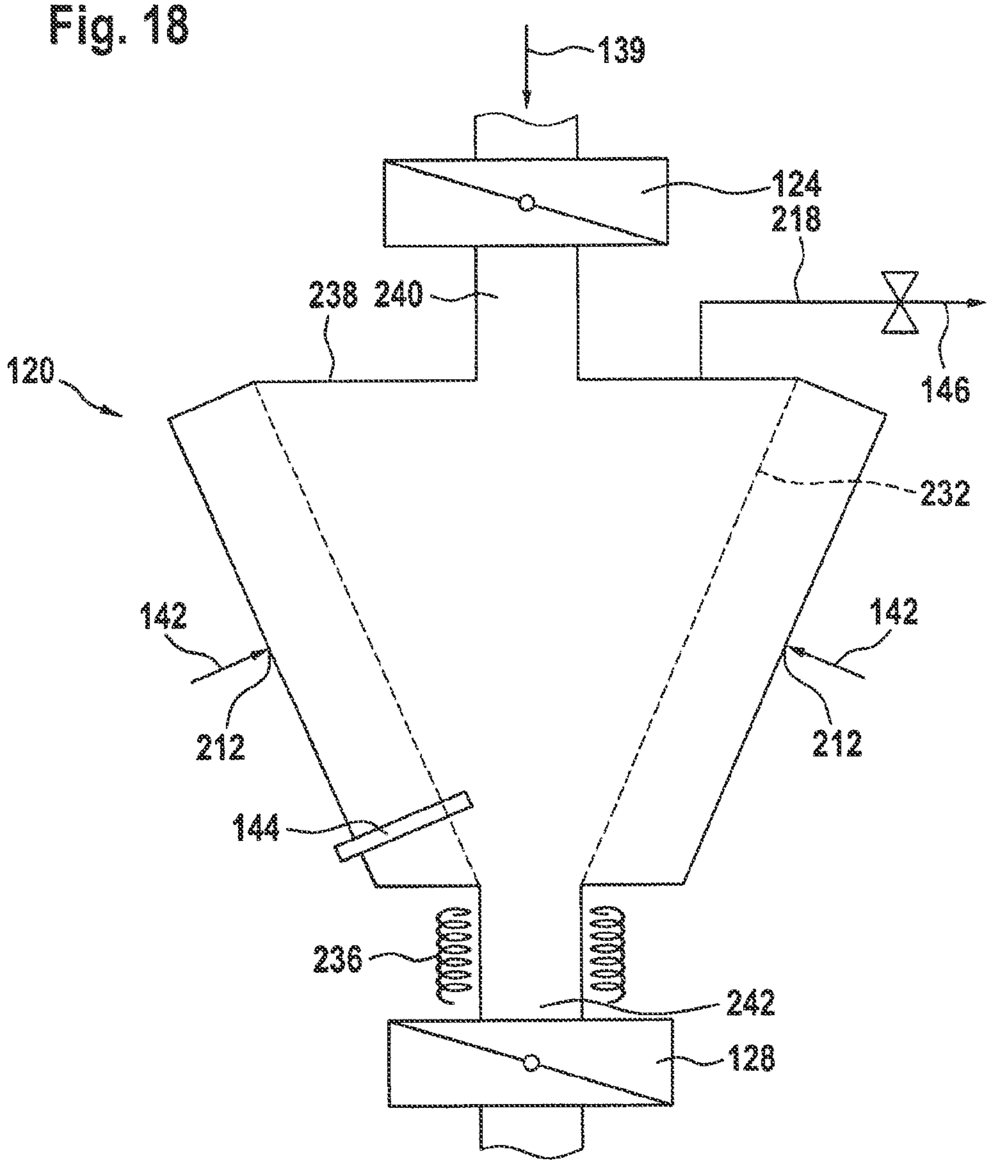
FIG. 18 shows a funnel-shaped embodiment of a reaction space.

FIG. 18 shows another exemplary embodiment of the reaction section 120. This reaction section 120 has a funnel-shaped configuration, wherein the reaction section 120 has a larger diameter at the upper end, i.e. the end of the material inlet 240, than at the lower end of the reaction section 120, i.e. at the end where the material outlet 242 is arranged at the reaction section 120. The reaction section comprises the ceiling 238 extending radially outwardly from the material inlet 240. From a radially outer end of the ceiling 238, the fluidizing plate 232 extends in an oblique direction toward the material outlet 242, thereby confining the reaction section 120. Between the fluidizing plate 232 and the sidewall 230, the intermediate space 237 is formed in which the oxidant inlet 212 is disposed. This funnel-shaped configuration has the advantage that the cleaned-off material 139 which reacts with the oxidant 142 is directed by gravity to the material outlet 242, and can then be discharged from the reaction space 210 by opening the shut-off member 128. The temperature control element 236 may be disposed around the material outlet 242. Further, the reaction section 120 may comprise the ignition source 144, which in particular projects into the reaction section 120. The waste gas outlet 218 is arranged in the ceiling 238, through which the mixture 146 of residues formed during the oxidation, unreacted oxidant, carrier gas (for example nitrogen ($N_2$)) and, if applicable, extinguishing agent, and heat can be discharged from the reaction section 120.

Figure 19:
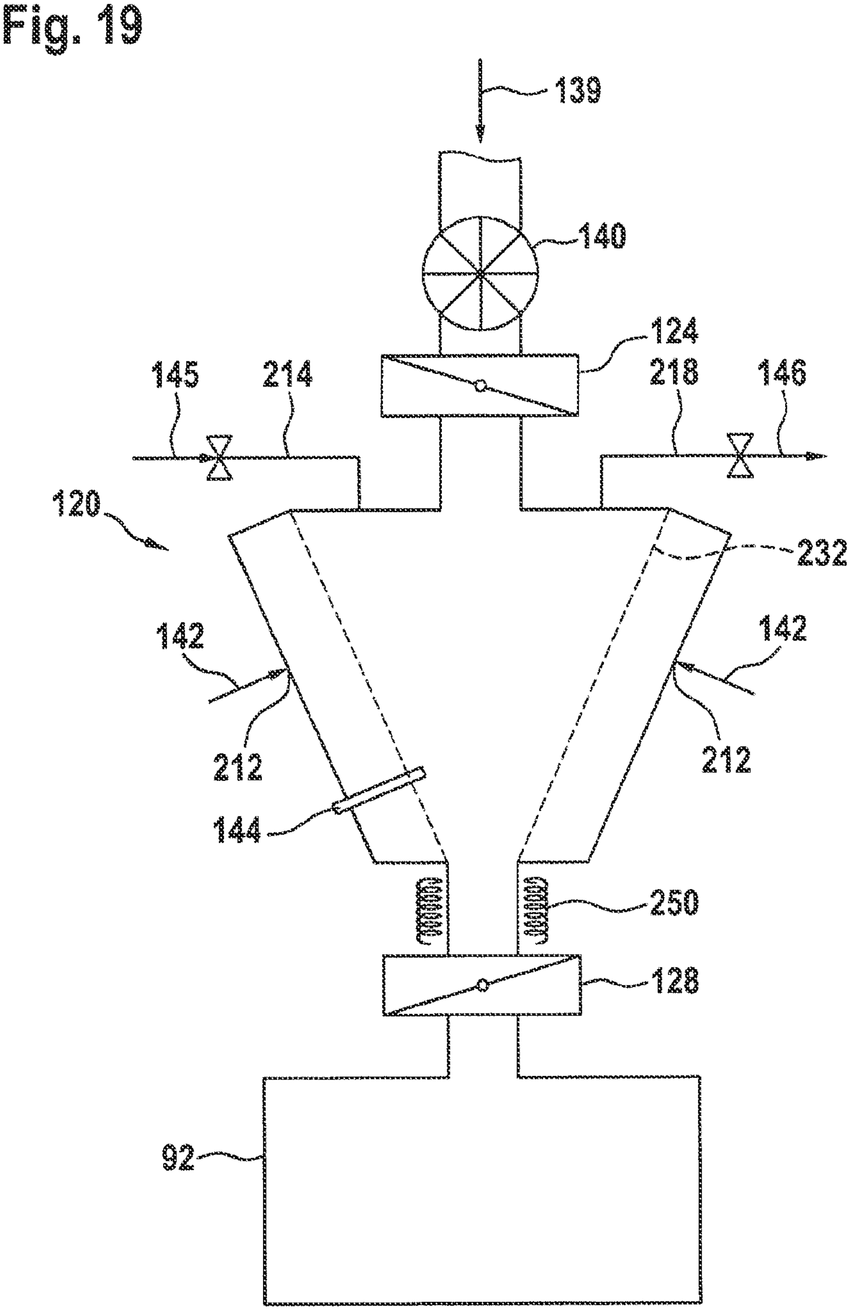
FIG. 19 shows the reaction section schematically illustrated in FIG. 15 with corresponding elements.

FIG. 19 illustrates the reaction section 120 shown schematically in FIG. 15. The rotary valve 140 is used as the metering member. Connected thereto is a reaction section 120 formed in accordance with that shown in FIG. 18. In addition thereto, the filtration aid inlet 214 is arranged in the ceiling 238, through which extinguishing agent 145 can be introduced into the reaction space 210 if necessary. Additionally, in the direction of material flow between the fluidizing plates 232 and the shut-off member 128, a region of the reaction space 210 is provided with the temperature control element 236 to introduce activation energy into the reaction space 210 in order to allow the oxidation reaction of cleaned-off material 139 and oxidant 142 to be reliably started. In addition or alternatively to the temperature control element 236, the ignition source 144 may be disposed in the reaction section 120. Downstream of the shut-off member 128 in the direction of material flow is arranged a, or the, agglomerate collecting container 92 such that the cleaned-off and inert material 141 may be collected in the agglomerate collecting container 92. The agglomerate collecting container 92 may be a disposable or single-use bucket that can be disposed of by service personnel once it is full, without explicitly emptying it.

Figure 20:
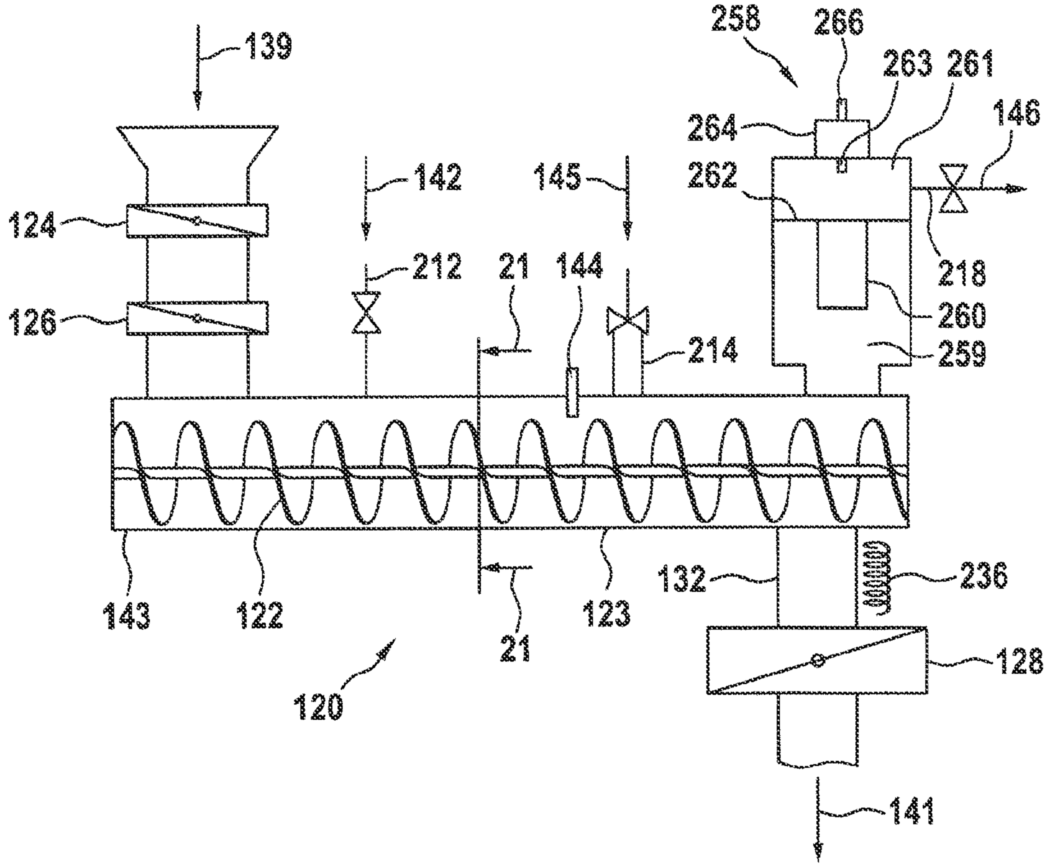
FIG. 20 shows a reaction section with a horizontally oriented mixing and transport device.

FIG. 20 shows another exemplary embodiment with the reaction section 120 having a transport member associated therewith. The reaction section 120 extends between an upstream inlet region, which is arranged following the shut-off members 124, 126, and a downstream outlet region, which is followed by the shut-off member 128. In the central part 143 of the reaction section 120 is the transport member, in the present embodiment the screw conveyor 122, for conveying/transporting and mixing cleaned-off material 139. The first shut-off member 124 and the second shut-off member 126 are arranged one behind the other in the direction of material flow, between the collection region 24 and the central part 143 of the reaction section 120. The cleaned-off material 139 falls from the collection region 24 through the shut-off members 124 and 126 into the central part 143. In this exemplary embodiment, the screw conveyor is horizontally oriented to convey the cleaned-off material 139 in a horizontal direction from the inlet of the reaction section 120 to the outlet of the reaction section 120. At the rear end of the screw conveyor 122 in the direction of material flow, an opening is formed at the bottom of a transport section 123 formed along the screw conveyor 122, through which opening the material transported by the screw conveyor 122 up to that point falls and passes to the shut-off member 128 arranged therebelow. The shut-off member 128 is arranged above the agglomerate collecting container 92 not shown in FIG. 20. The shut-off member 128 disposed between the rear part 132 and the agglomerate collecting container 92 separates the reaction section 120 from the agglomerate collecting container 92.

The oxidant inlet 212 is arranged in the upstream portion of the reaction section 120, for example in a front half of the central part 143 of the reaction section 120. Through this oxidant inlet 212, the oxidant 143 can be introduced into the transport section 123 of the screw conveyor 122, where it is mixed with the cleaned-off material 139 transported by the screw conveyor 122 and causes an oxidation reaction of the cleaned-off material 139. This converts the cleaned-off material 139 into a poorly reactive or inert material 141. Introducing the oxidant 143 into the transport section 123 has the advantage that fluidization by an oxidant flow is not necessary, because mixing of the cleaned-off material 139 with the oxidant 143 occurs mechanically by the screw conveyor 122. Downstream of the oxidant inlet 212 in the direction of material flow, in particular in a rear half of the central part 143, the filtration aid inlet 214 or extinguishing agent inlet is arranged, through which the filtration aid or extinguishing agent can be introduced into the reaction section 120, in particular into the transport section 123. In addition, the ignition source 144 may also be arranged here.

A waste gas outlet region 258 is arranged at the rear end of the screw conveyor 122, in the present embodiment opposite the opening formed at the bottom of the transport section 123. The waste gas outlet region 258 comprises a filter unit 260 supported on a partition 262. The filter unit 260 may comprise one or more filter elements. The partition 262 divides the waste gas outlet region 258 into a raw gas space 259 and a clean gas space 261. A mixture 146, which is formed from residues formed during the oxidation occurring in the reaction section 120, as well as excess proportions of the oxidant flow and optionally the filtration aid flow, enters the raw gas space 259. The filter unit 260 is configured to filter the mixture 146 to remove particulate oxidation residues therefrom. The clean gas space 261 then contains a filtered gaseous mixture that can be discharged via the waste gas outlet 218, which is arranged at the clean gas space 261, and can be discharged into the environment, for example. A pressurized-gas cleaning-off unit associated with the filter unit 260 is also arranged in the clean gas space 261, which is arranged to generate pressurized gas pulses that act on the filter element or elements for cleaning-off. The pressurized gas pulses pass through a pressurized gas opening 263 from a pressurized gas storage unit 264 into the clean gas space and from there to the filter element or elements. The pressurized gas storage 264 can preferably be filled with pressurized gas via a pressurized gas line 266. The pressurized gas serves to clean-off the filter unit 260 as soon as the filter performance of the filter unit 260 deteriorates. In that case, the pressurized gas is introduced into the clean gas space 261, whereby foreign objects that have settled on the raw gas side of the filter unit 260 are cleaned off from the filter unit 260. These foreign objects then fall out of the waste gas outlet region 258, through the opening in the transport section 123, through the rear part 132 of the reaction section 120, and after opening the shut-off member 128, through the shut-off member 128 into the agglomerate collecting container 92, which is not shown. This is particularly advantageous because both the inert material 141 and the cleaned-off foreign objects can be collected in the agglomerate collecting container 92 and subsequently disposed of. At the rear part 132 of the reaction section, the temperature control element 236 may be arranged. For the function of the temperature control element, see FIG. 16.

The transport member may be a paddle mixer instead of a screw conveyor. A paddle mixer has an axis from which a plurality of paddles extend in radial direction, the paddles being distributed, preferably uniformly distributed, in the axial direction along the axis. These paddles can both move the cleaned-off material along the transport path 123, and allow advantageous mixing of the cleaned-off material with the oxidant. This can ensure that preferably all of the cleaned-off material is oxidized, thereby preventing subsequent oxidation.

Figure 21:
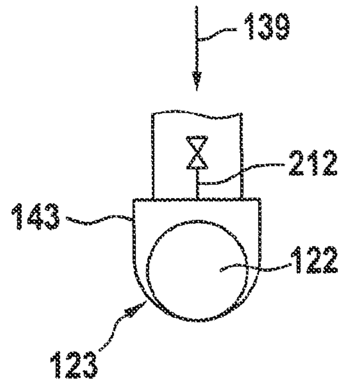
FIG. 21 shows a cross-section through a central part of the reaction section of FIG. 20.

FIG. 21 shows a sectional view 21-21 through the transport section 123 of FIG. 20. The transport section 123 has in particular a trough-like shape. This means that a part 270 directed towards a bottom has a round cross-section and an upper part 272 directed away from the bottom has an angular cross-section. The transport member, for example the screw conveyor 122 or the paddle mixer, is arranged to contact the lower part 270 or to travel along the lower part 270 at a distance of a few millimeters, preferably 5 mm.

The transport member may rotate in different directions. For example, the transport member may rotate to transport the cleaned-off material 139 to the rear part 132 of the reaction section 120 so that it can be discharged therefrom into the agglomerate collecting container 92, which is not shown. The transport member may also be rotated in alternating directions to allow good mixing of the cleaned-off material 139 with the oxidant 142 or the extinguishing agent. This may alternatively ensure that the complete cleaned-off material 139 oxidizes with the oxidant 142.

It should be expressly noted that the variants described above with reference to the individual figures may be combined with each other and are not limited to the figure in which the corresponding variant is described. For a better understanding, the same reference numerals have been used in all figures for like components in each case. It is understood that the description belonging to a reference numeral in a particular case also refers to all other figures in which the reference numeral occurs.

The operation of the discharge arrangement, in particular the reaction section 120, can be continuous, in particular when shut-off members with a lock function are used. The provision of suitable transport devices in the reaction section also favors continuous operation for oxidation of foreign objects, in particular the provision of a screw conveyor, a conveying fluid and/or a rotary valve in the reaction section. Batch or intermittent operation is possible, in particular when valves are used as shut-off members.

The invention claimed is:

1. A method for the dry filtration of a gas flow carrying foreign objects in a filter device for cleaning off waste gas produced in additive manufacturing technologies, comprising:

conducting a raw gas flow containing foreign objects into a raw gas space of a filter unit which has at least one filter surface separating a raw gas side from a clean gas side, feeding oxidant to a reaction region located on the raw gas side of the filter surface downstream of the filter surface, wherein the reaction region is located downstream of the raw gas space with respect to the transport of foreign objects that have accumulated on the filter surface and have been cleaned off from the filter surface; such that foreign objects contained in material cleaned off from the filter surface and/or in the raw gas flow react with the oxidant in the reaction region to form oxide-containing foreign objects; and wherein a heat transfer fluid is flown through the reaction region; wherein an arrangement is provided for supplying the heat transfer fluid to the reaction region and discharging the heat transfer fluid after flowing through the reaction region in order to dissipate heat generated during the reaction.

2. The method according to claim 1, wherein the oxidant is air or an oxygen-containing gas.

3. The method according to claim 2, wherein the reaction region is located downstream of the raw gas space, and/or wherein an agglomerate collection region is provided which is arranged to receive material cleaned off from the filter surface, wherein foreign objects or agglomerates containing foreign objects, which are accumulated on the filter surface, are cleaned off and collected and stored in the agglomerate collection region;

wherein particularly the agglomerate collection region comprises a first closure means which is controlled such that it closes off the raw gas space with respect to a discharge region downstream of the raw gas space for the removal of material cleaned off from the filter surface or establishes a connection between the raw gas space and the discharge region, wherein in particular the discharge region contains the reaction region; and the oxidant is fed to the discharge region.

4. The method according to claim 3, wherein the discharge region comprises a second closure means arranged downstream of the first closure means in the direction of transport of material cleaned off from the filter surface;

wherein particularly the reaction region is located between the first closure means and the second closure means.

5. The method according to claim 2, wherein a conveying member for transporting material cleaned off from the filter surface is provided in the reaction region, in particular a screw conveyor, a rotary valve, a gradient and/or a fluidizing device; wherein the conveying member is designed in particular such that a transport direction of material cleaned off from the filter surface can be reversed.

6. The method according to claim 3, wherein the discharge region comprises an agglomerate collecting container;

wherein particularly the agglomerate collecting container comprises the reaction region; and/or wherein particularly at least one member for moving material cleaned off from the filter surface is provided in the agglomerate collecting container, in particular a screw conveyor, a fluidizing device, a pivoting device for the agglomerate collecting container and/or a mixer.

7. The method according to claim 2, wherein the reaction region can be temperature-controlled, in particular heated and/or cooled, and/or wherein the reaction region has an ignition device to start the reaction of foreign objects with the oxidant; and/or wherein the foreign objects are self-igniting; and/or wherein the foreign objects contain metals or are metals and have a granular, in particular chip-like or powder-like, configuration, in particular titanium, aluminum, magnesium, alloys of these elements, structural steel, quenched and tempered steel, and/or high-alloy stainless steel.

8. The method according to claim 2, further comprising supplying filtration aid to the raw gas flow, the filter surface and/or the reaction region; wherein the filtration aid is configured to suppress a reaction of foreign objects with oxidants, in particular with oxygen;

wherein particularly the filtration aid is an inorganic material, in particular an inorganic material based on silicon dioxide or an inorganic material based on calcium carbonate; and/or wherein particularly the filtration aid has a granular, in particular powdery, configuration when added; and/or wherein particularly the filtration aid is configured to bind metal-containing foreign objects having a granular configuration in agglomerates, in particular at temperatures of 600° C. or more, in particular at temperatures 650° C. or more, in particular at temperatures f 700° C. or more, in particular at temperatures of 750° C. or more, in particular at temperatures of 800° C. or more, in particular at temperatures up to 1000° C., in particular at temperatures up to 1250° C., in particular at temperatures up to 1500° C.

9. The method according claim 8, wherein the filtration aid has an average particle size of 10 to 30 μm, preferably between 15 and 25 μm; and/or wherein the filtration aid has a softening point of 600° C. or more, in particular of 650° C. or more, in particular of 700° C. or more, in particular of 750° C. or more, in particular of 800° C. or more, and up to 1000° C., in particular up to 1250° C., in particular up to 1500° C.; and/or wherein the filtration aid comprises as main constituent one of the following materials: expanded glass beads, glass powder, silicon dioxide particles, quartz powder or a mixture of at least two of these materials.

10. The method according to claim 8, wherein foreign objects-containing agglomerates accumulated on the filter surface are cleaned off and collected and stored in an agglomerate collection region, wherein the agglomerate collection region and/or the discharge region and/or the reaction region have filtration aid and/or oxidant applied thereto;

wherein particularly the application of filtration aid and/or oxidant to the agglomerate collection region and/or the discharge region and/or the reaction region takes place when a predetermined amount of agglomerates is present in the agglomerate collection region and/or the discharge region and/or the reaction region;

wherein particularly:

the application of the oxidant to the agglomerate collection region and/or to the discharge region and/or to the reaction region is carried out in timed relationship with the application of filtration aid to the agglomerate collection region and/or the discharge region, in particular preceding the application of filtration aid to the agglomerate collection region and/or the discharge region and/or the reaction region, or following the application of filtration aid to the agglomerate collection region and/or the discharge region and/or the reaction region.

11. A filter device for cleaning raw gas carrying foreign objects, comprising:

at least one filter element having at least one filter surface separating a raw gas side from a clean gas side in a raw gas space to which a raw gas flow containing foreign objects can be fed;

an oxidant supply means adapted to feed an oxidant to a reaction region located on the raw gas side of the filter surface downstream of the filter surface;

wherein the reaction region is located downstream of the raw gas space with respect to the transport of foreign objects that have accumulated on the filter surface and have been cleaned off from the filter surface;

such that foreign objects contained in material cleaned off from the filter surface and/or in the raw gas flow react with the oxidant in the reaction region to form oxide-containing foreign objects; wherein an arrangement is provided for supplying a heat transfer fluid to the reaction region and discharging the heat transfer fluid after flowing through the reaction region in order to dissipate heat generated during the reaction.

12. The filter device according to claim 11, wherein the oxidant is air or an oxygen-containing gas, and/or wherein the reaction region is located downstream of the raw gas space; and/or wherein an agglomerate collection region is provided which is arranged to receive material cleaned off from the filter surface, wherein foreign objects or agglomerates containing foreign objects, which are accumulated on the filter surface, are cleaned off and collected and stored in the agglomerate collection region;

wherein the agglomerate collection region has a first closure means which can be controlled such that it closes off the raw gas space with respect to a discharge region downstream of the raw gas space for the removal of material cleaned off from the filter surface, or establishes a connection between the raw gas space and the discharge region;

wherein in particular the discharge region contains the reaction region.

13. The filter device according to claim 11, wherein the oxidant supply means opens into the discharge region; and/or wherein the discharge region comprises a second means arranged downstream of said first closure means in the direction of transport of material cleaned off from the filter surface.

14. The filter device according to claim 13, wherein the reaction region is located between the first closure means and the second closure means.

15. The filter device according to claim 11, wherein a conveying member for transporting material cleaned off from the filter surface is provided in the reaction region, in particular a screw conveyor, a rotary valve, a gradient and/or a fluidizing device; wherein the conveying member in particular is designed such that a transport direction of material cleaned off from the filter surface can be reversed.

16. The filter device according to claim 11, further comprising a waste gas outlet region comprising a filter unit with at least one filter element, and a waste gas outlet, wherein the waste gas outlet region comprises in particular a pressurized-gas cleaning-off device adapted to apply pressurized air pulses to the at least one filter element; the waste gas outlet region being designed in particular such that a mixture of residues, formed in particular during the reaction, and excess oxidant can be filtered therein and discharged through the waste gas outlet.

17. The filter device according to claim 11, wherein the discharge region comprises an agglomerate collecting container;

wherein the agglomerate collecting container comprises in particular the reaction region; and/or wherein at least one member for moving material cleaned off from the filter surface is provided in the agglomerate collecting container, in particular a screw conveyor, a fluidizing device, a pivoting device for the agglomerate collecting container and/or a mixer.

18. The filter device according to claim 11, wherein the reaction region can be temperature-controlled, in particular can be heated and/or cooled, and/or wherein the reaction region comprises an ignition device for starting the reaction of foreign objects with the oxidant.

19. The filter device according to claim 11, further comprising a filtration aid feed arrangement having a filtration aid feed line for feeding filtration aid, which opens into the raw gas space, into the raw gas flow upstream and/or downstream of the raw gas space and/or into the reaction region and/or into the agglomerate collecting container, and/or an oxidant feed line for feeding oxidant;

wherein the filtration aid is configured to suppress a reaction of foreign objects with oxidant, in particular with oxygen.

* * * * *